June 14, 1960   W. DE BACK ET AL   2,940,493
FRUIT PREPARATION MACHINE
Original Filed Sept. 6, 1949   15 Sheets-Sheet 14

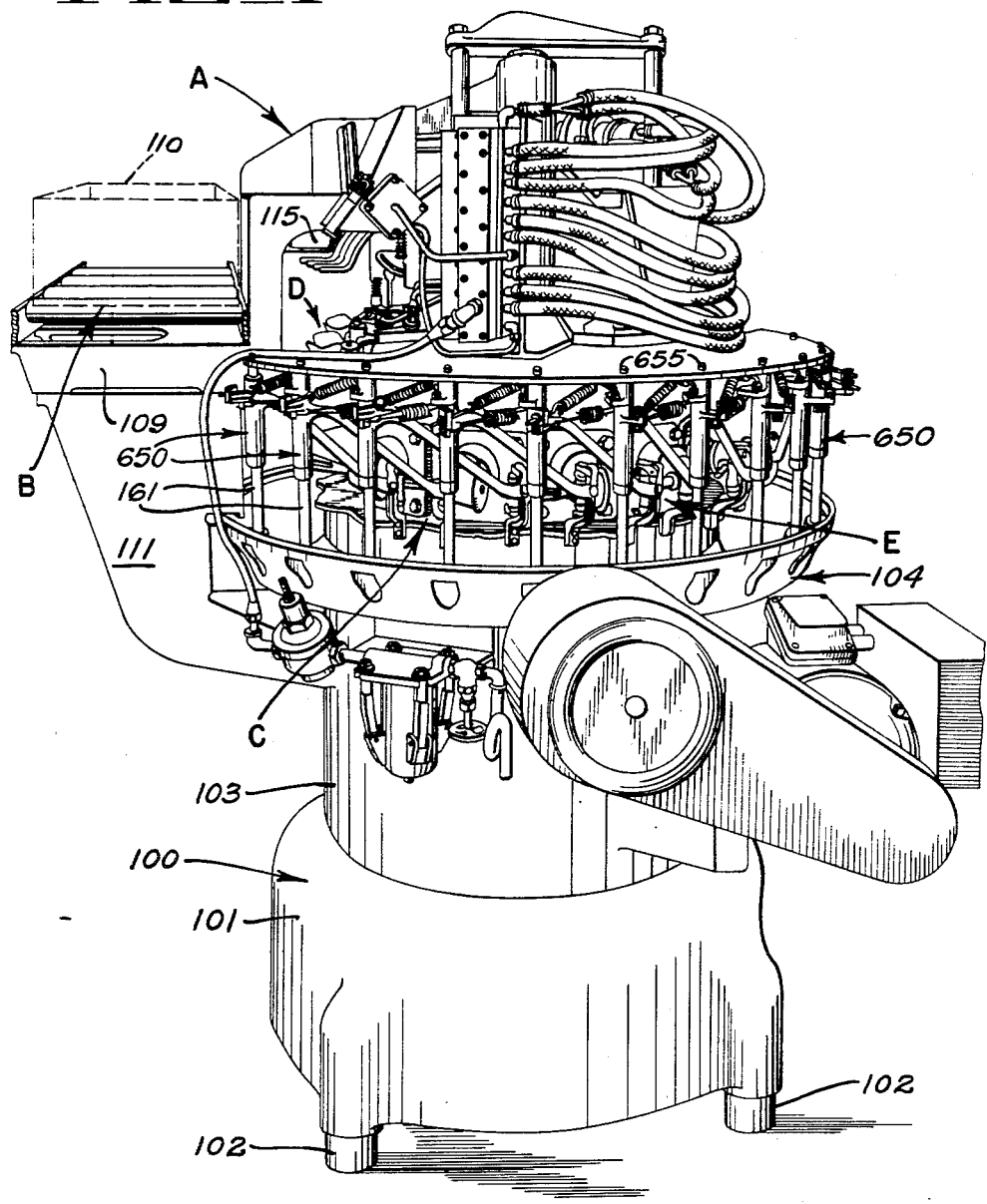

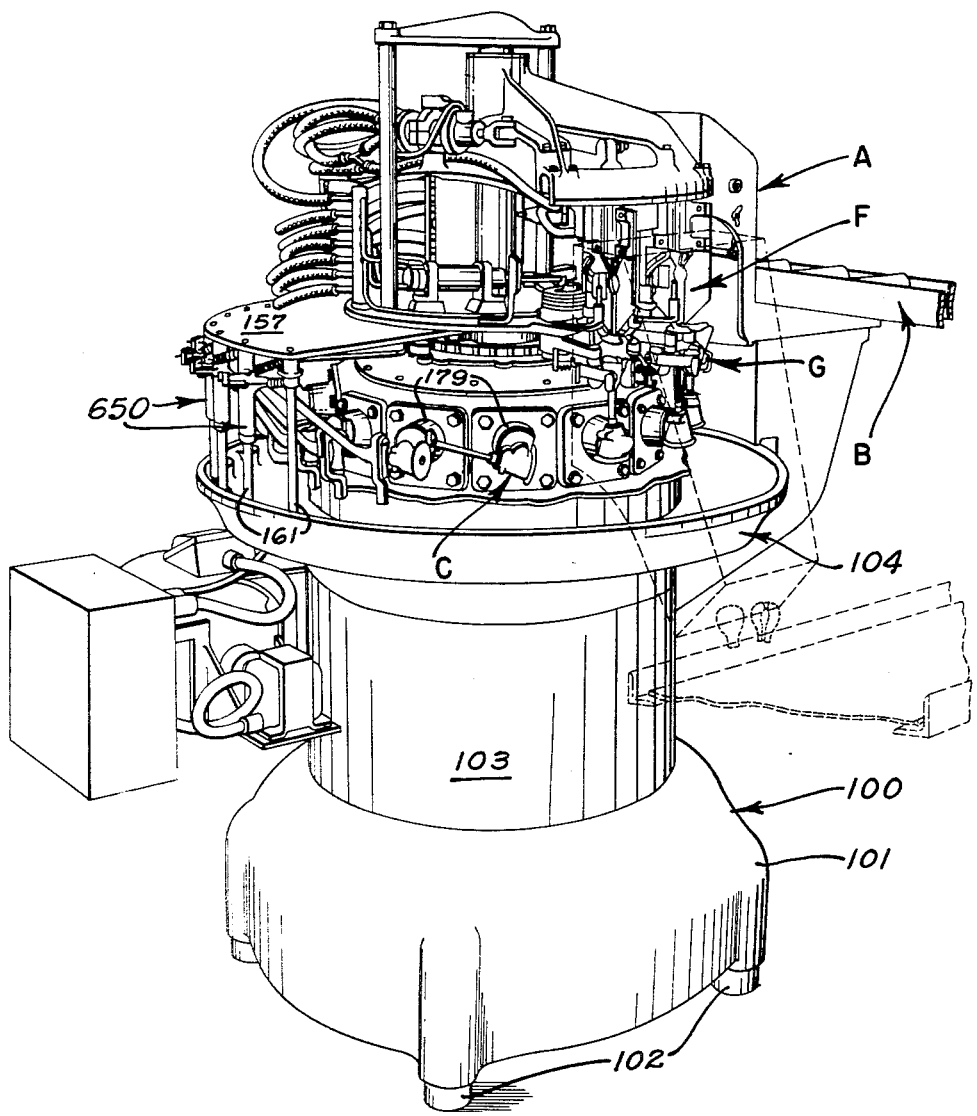
FIG_2

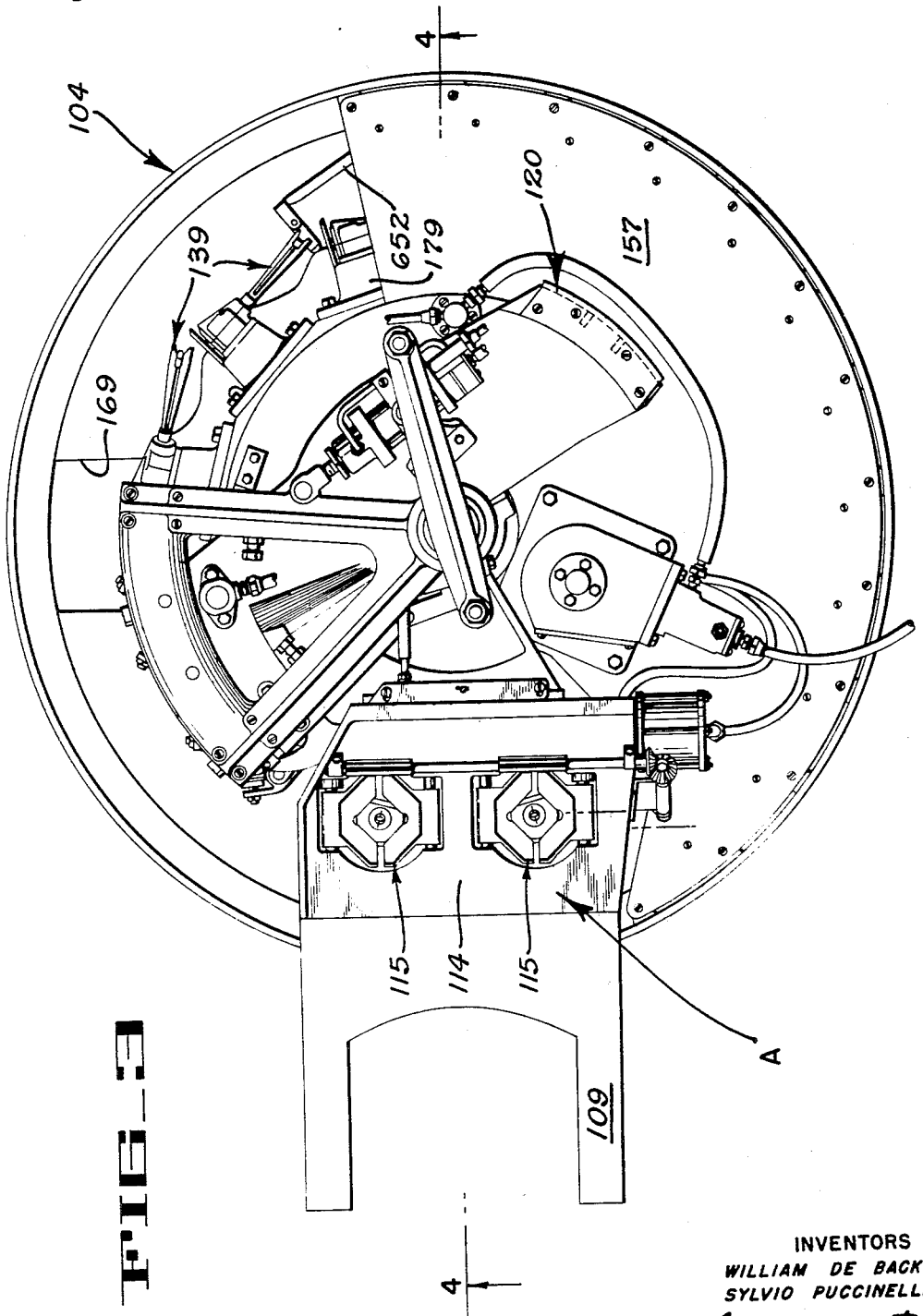

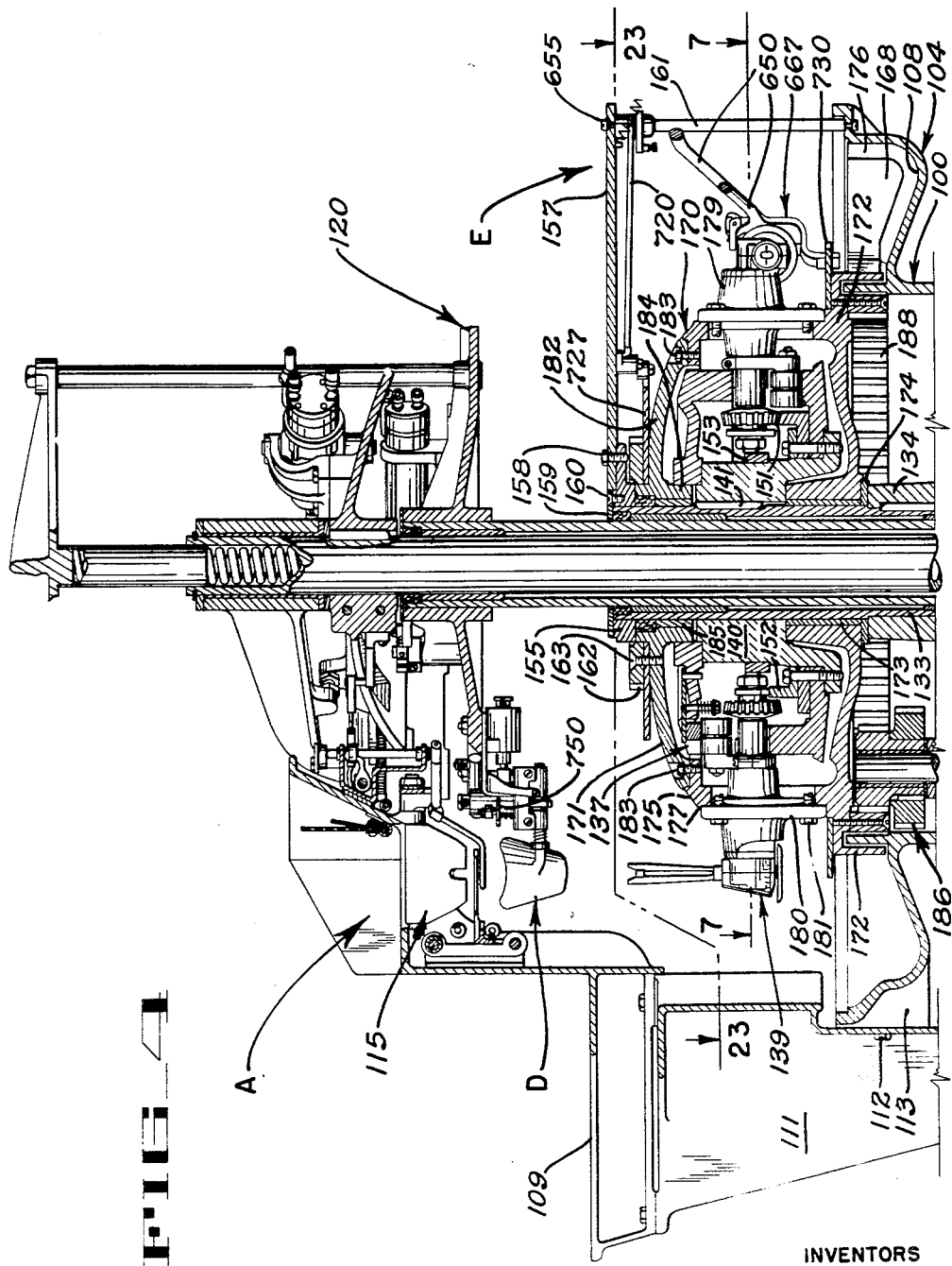

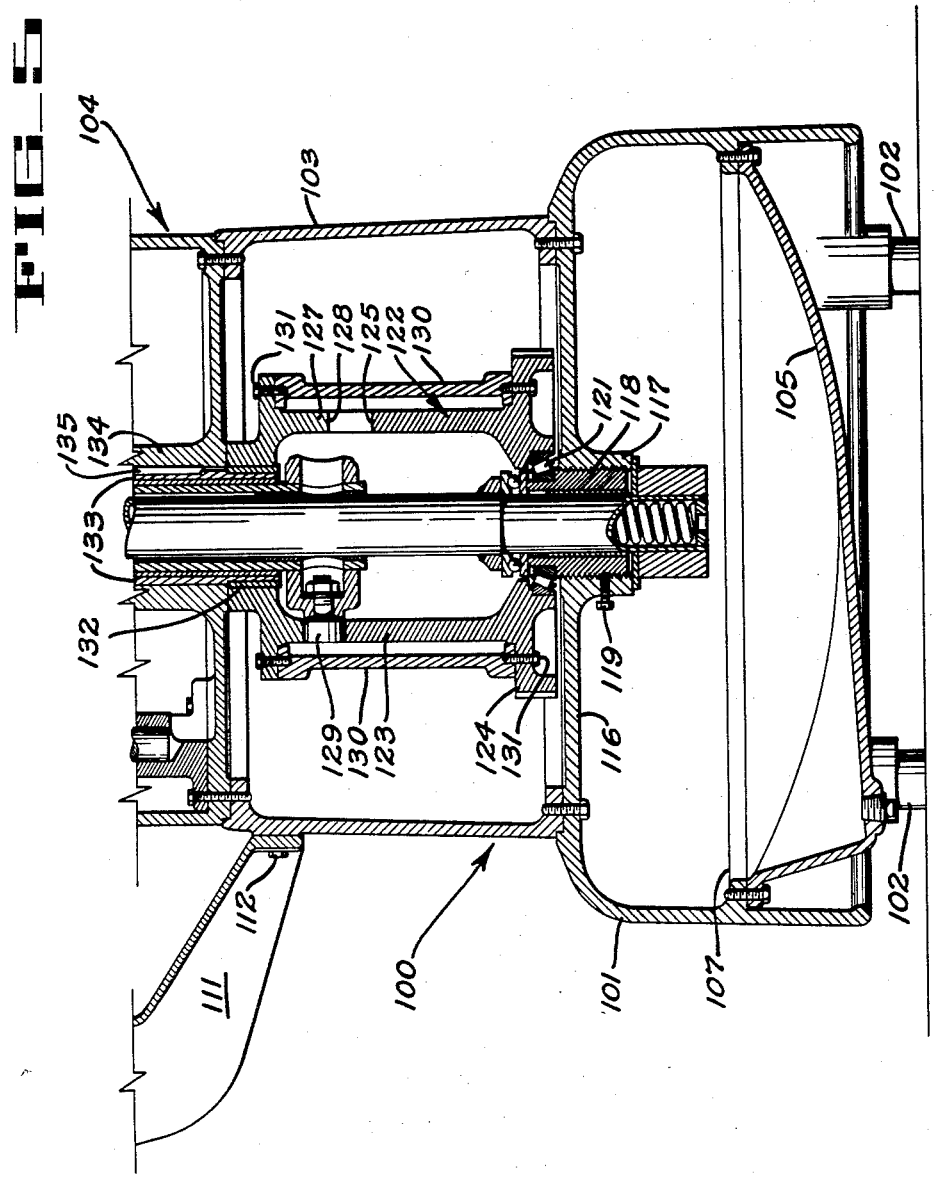

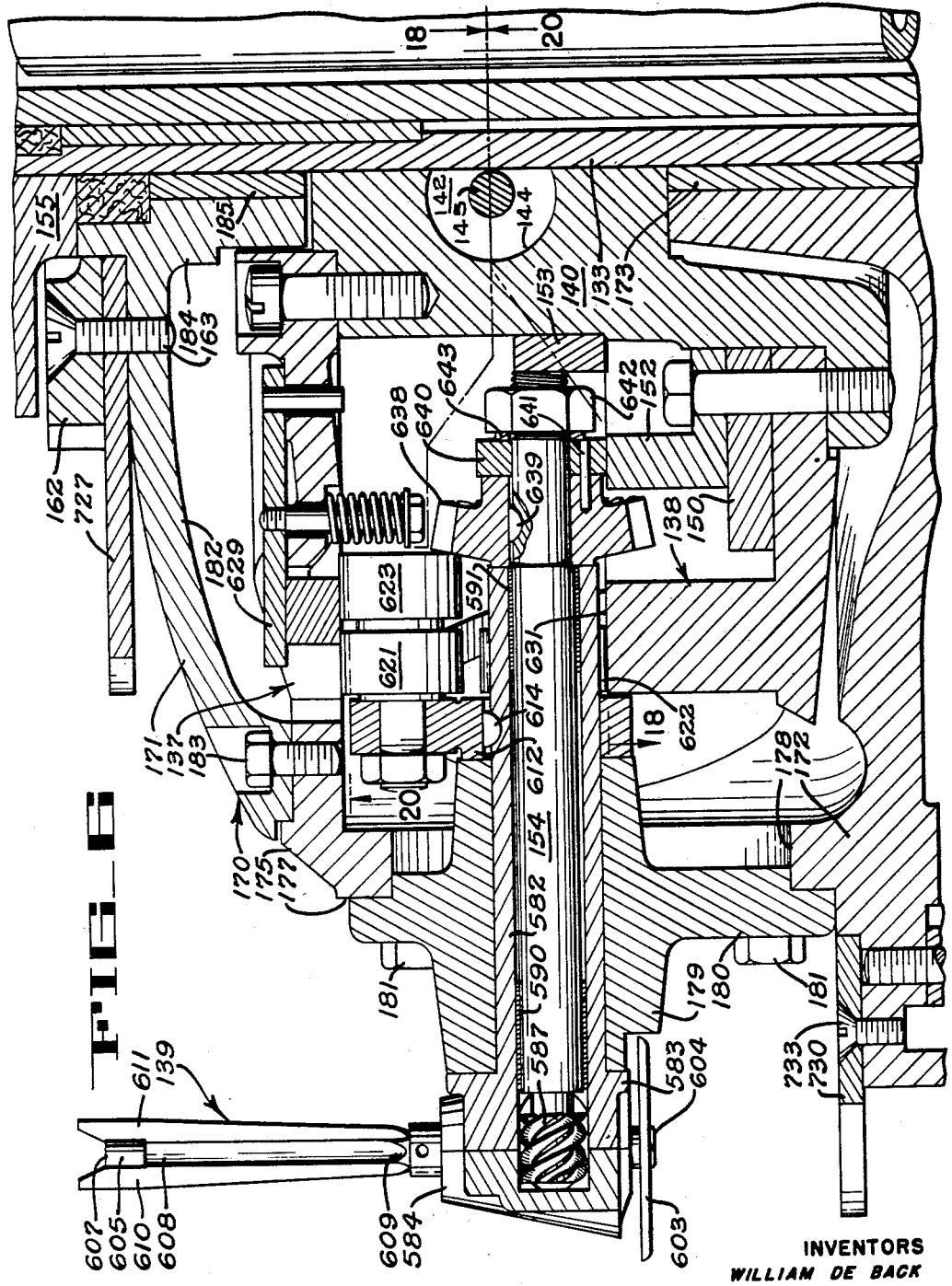

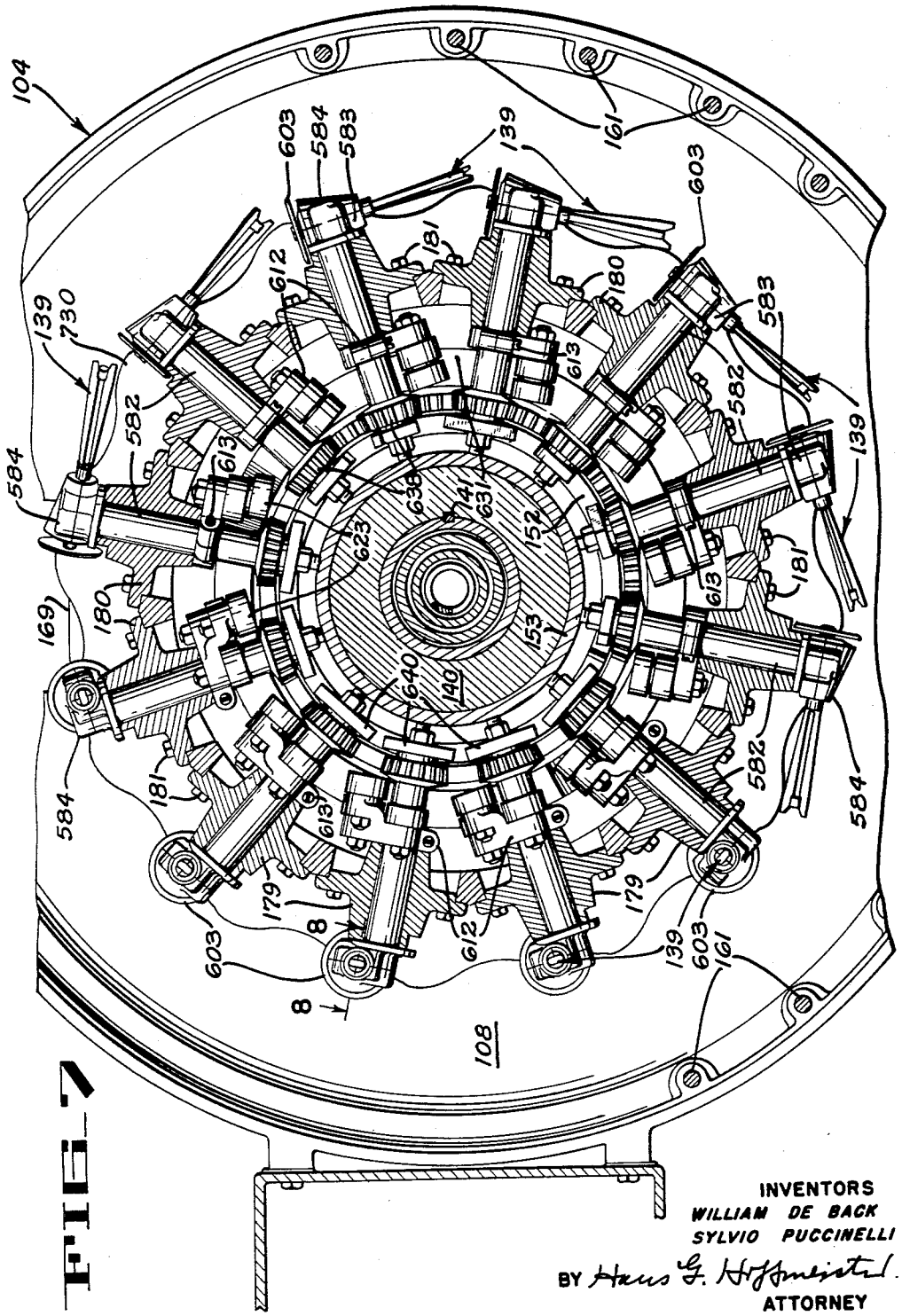

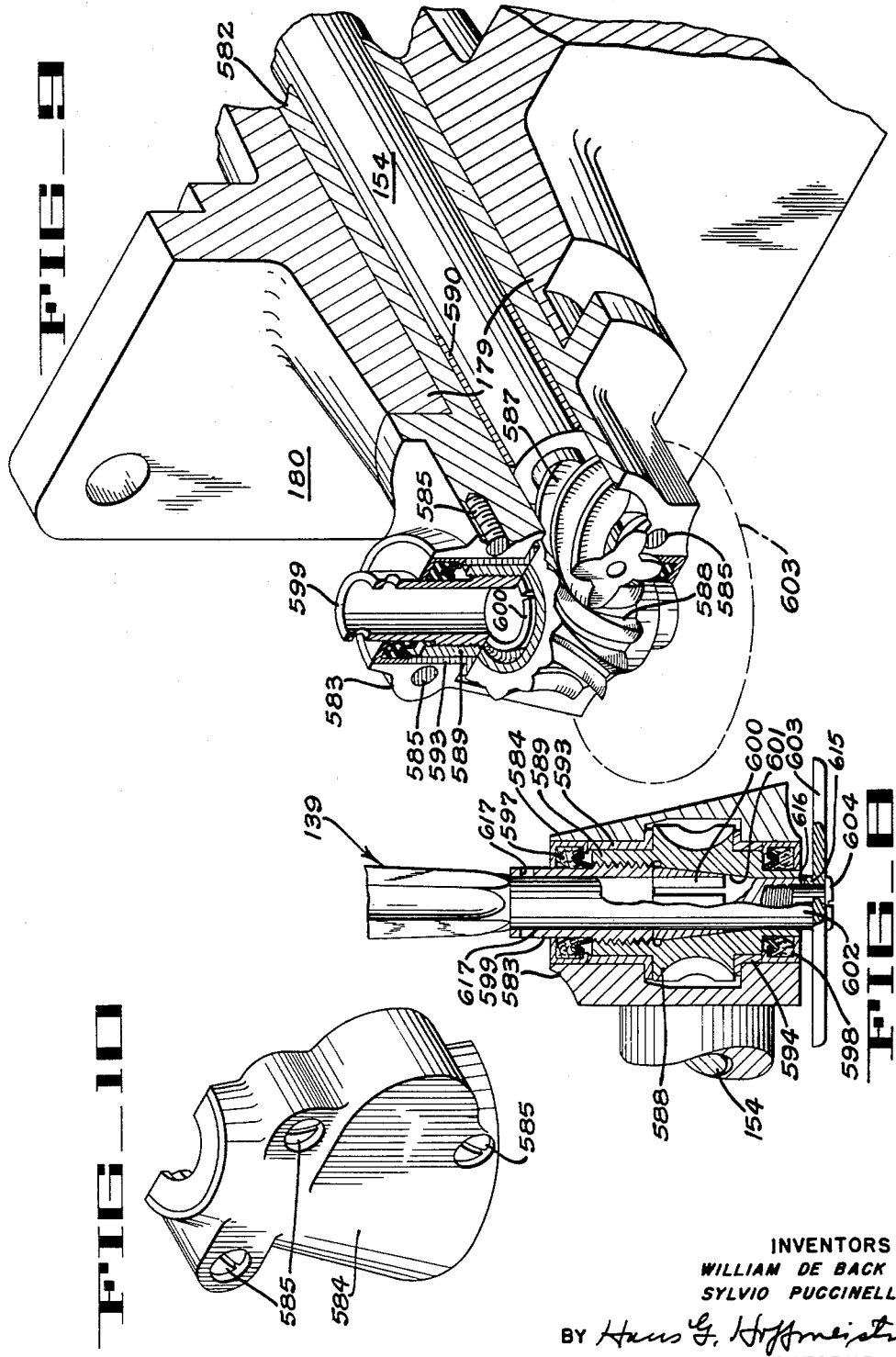

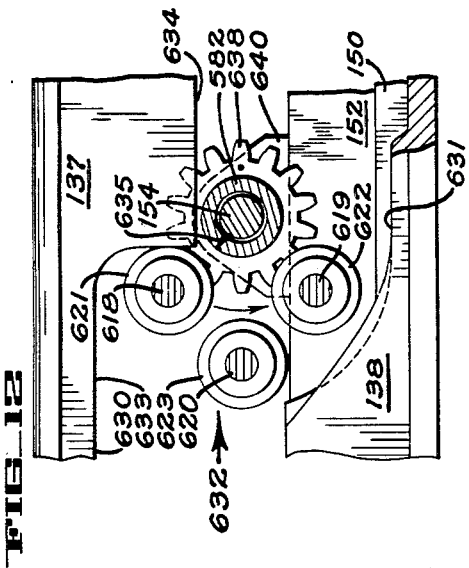
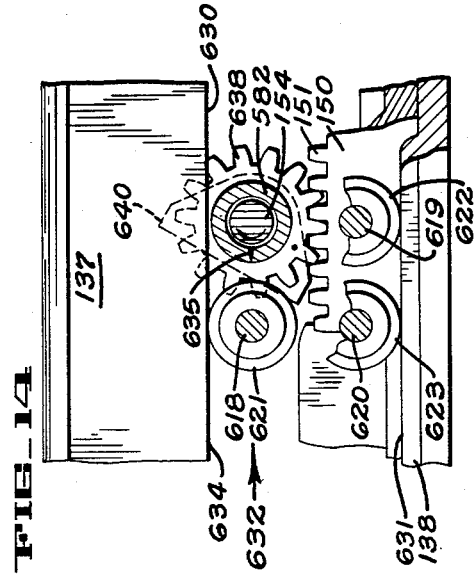
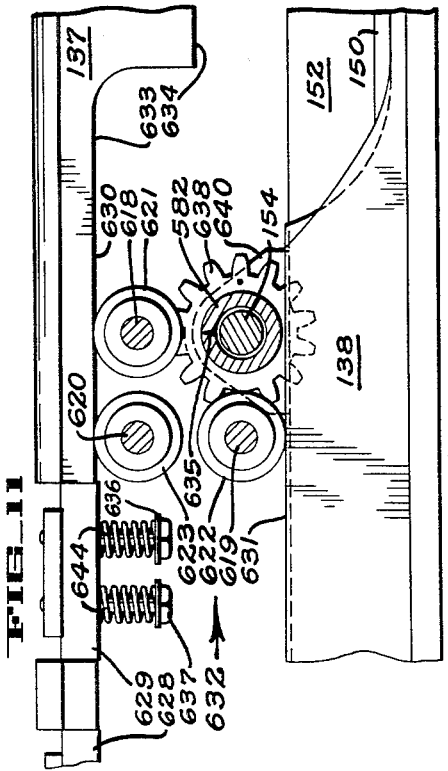
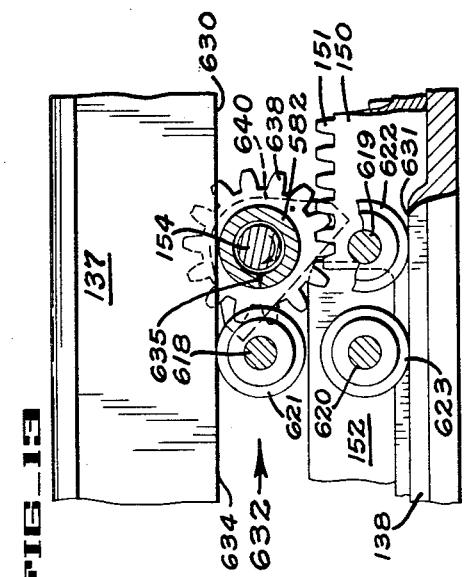

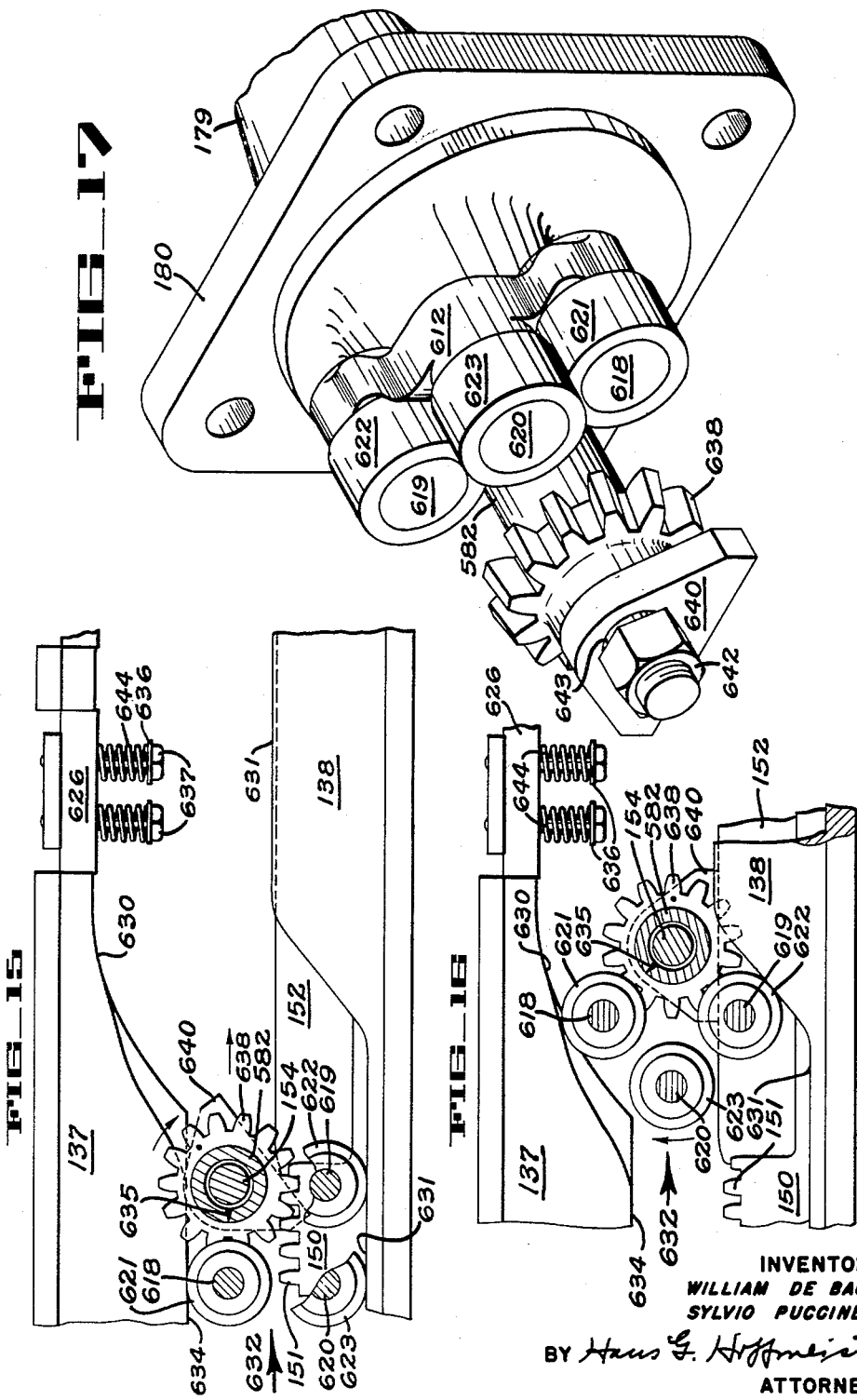

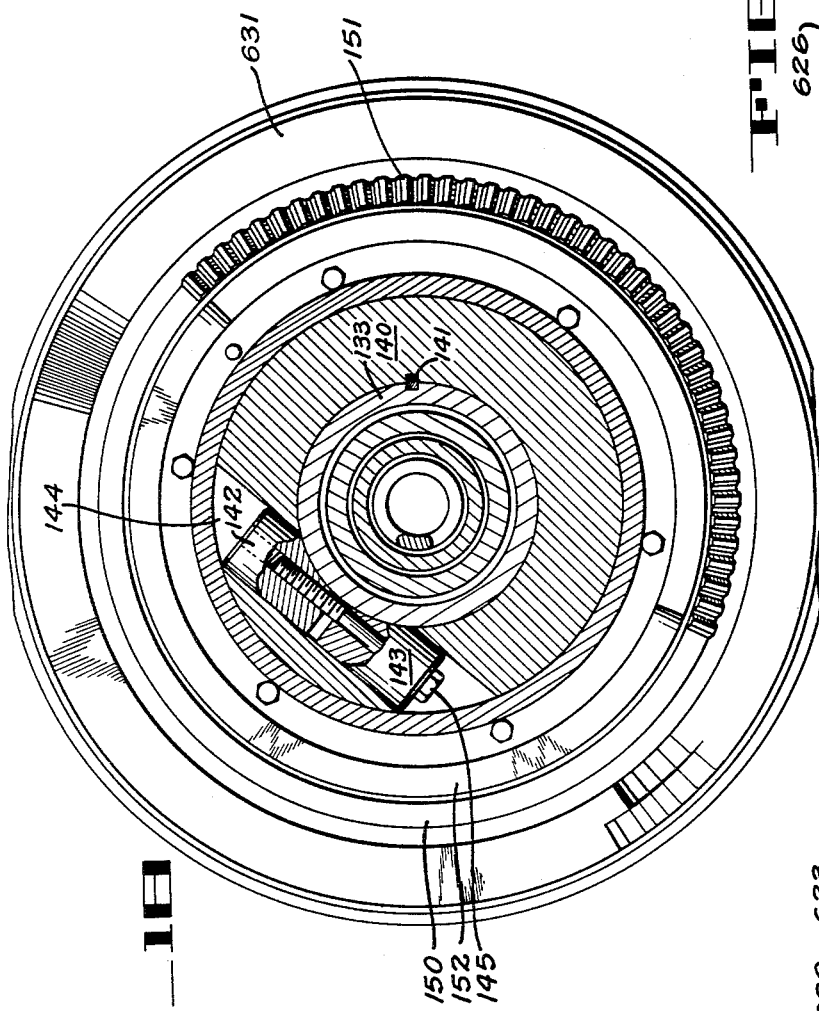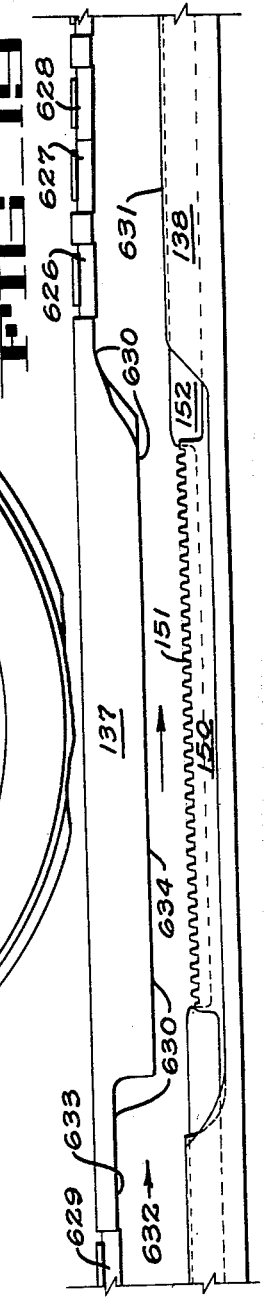

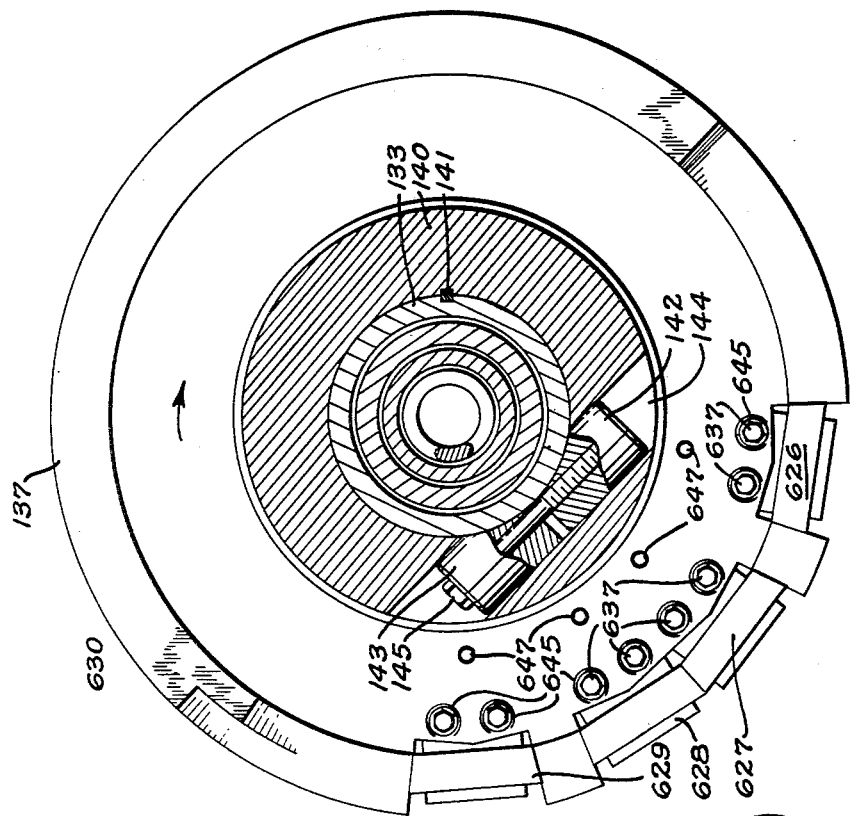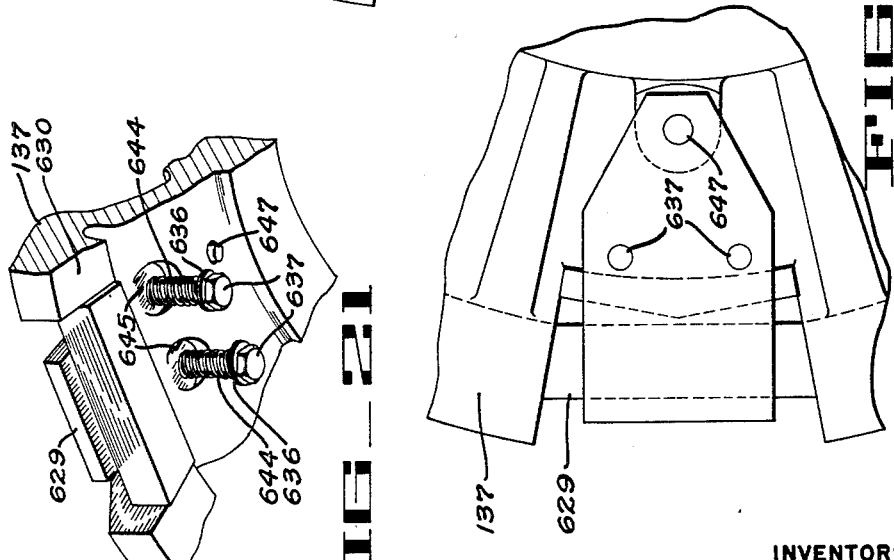

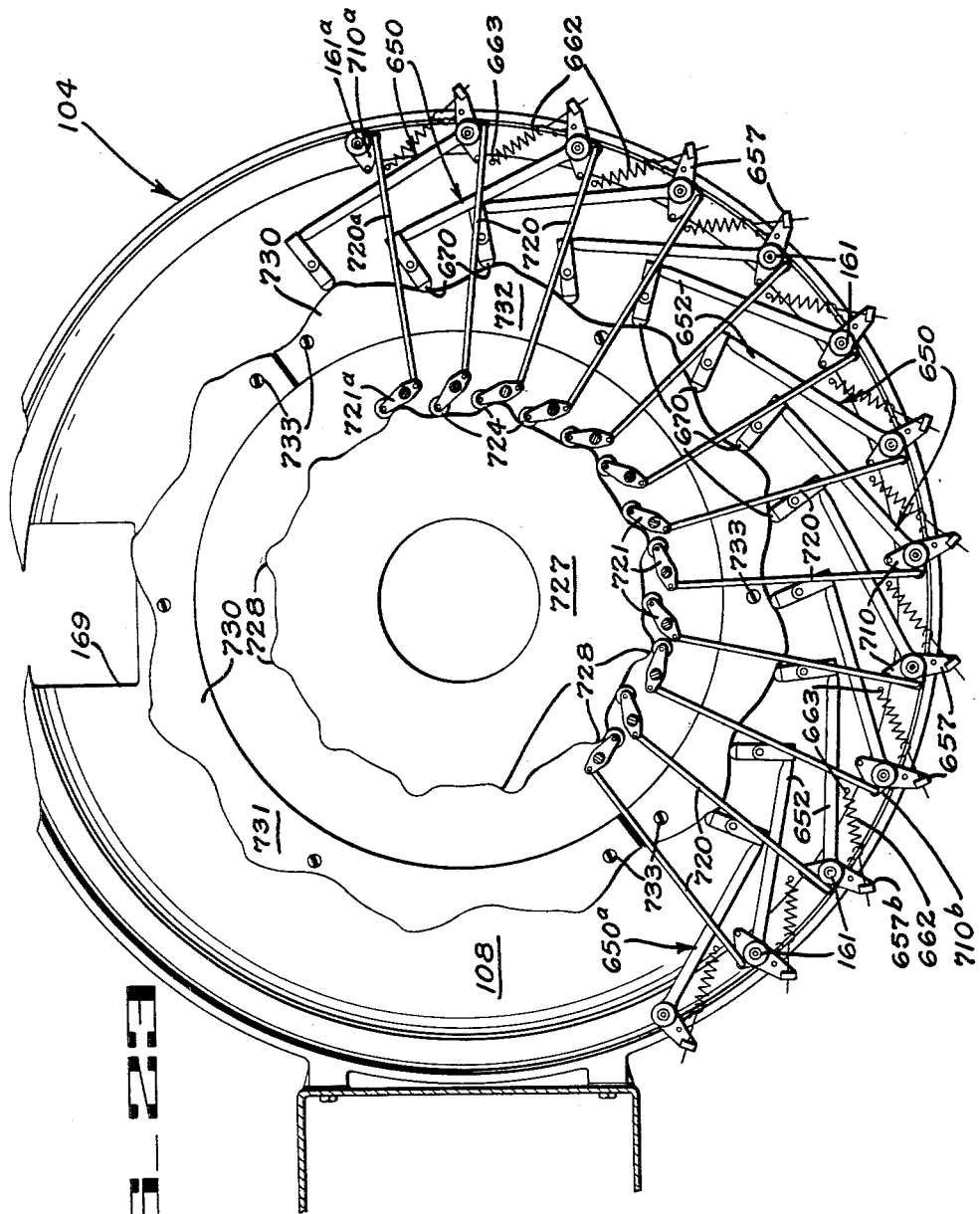

INVENTORS
WILLIAM DE BACK
SYLVIO PUCCINELLI
BY Hans G. Hoffmeister
ATTORNEY ns # United States Patent Office 2,940,493
Patented June 14, 1960

2,940,493
FRUIT PREPARATION MACHINE

William de Back, St. Nicolas-Waes, Belgium, and Sylvio Puccinelli, San Jose, Calif., assignors to Food Machinery and Chemical Corporation, San Jose, Calif., a corporation of Delaware Original application Sept. 6, 1949, Ser. No. 114,168, now Patent No. 2,699,191, dated Jan. 11, 1955. Divided and this application Jan. 7, 1955, Ser. No. 480,422

18 Claims. (Cl. 146—43)

This invention appertains to fruit preparation machines, and relates more particularly to improvements in mechanism for preparing fruit, such as pears, for canning or drying.

This application is a division of our co-pending application, U.S. Serial No. 114,168, filed September 6, 1949, now Patent No. 2,699,191, issued January 11, 1955.

An object of the present invention is to provide an improved high speed fruit preparation machine.

Another object is to provide a fruit preparation machine wherein a fruit is accurately positioned with relation to its stem-blossom axis, and the angular and rotative positions of the fruit are thereafter changed in predeterminded sequence relatively to said axis to facilitate and improve the performance of a succession of fruit preparation steps.

Another object is to provide improved stemming tube operation in a fruit preparation machine by tilting the stemming tubes between upright and horizontal position at predetermined stages in their travel through the machine.

Another object is to provide improved stemming tube positioning, tilting and rotating mechanisms at predetermined stages throughout a cycle of operation of a fruit preparation machine.

Another object is to provide means for retaining a fruit against endwise displacement under axial stresses during an endwise peeling cut without obstructing the operation of the peeling instrumentality used in making the peeling cut.

Another object is to provide a mechanism with tiltable stemming tubes for receiving fruit in axially impaled condition thereon with the tubes in upright position, and then for tilting the tubes to dispose the fruit in axially horizontal position, and moving the fruit in the latter position along a predetermined path past a peeling device.

Another object is to provide a fruit preparation machine having a plurality of tiltable and axially rotatable stemming tubes with off-center fruit retaining means mounted to hold a fruit against withdrawal from a stemming tube upon which it is impaled, without interference with a peeling device adapted to take a longitudinal peeling cut extending the entire length of the fruit.

Another object of the invention is to provide means for holding a rotating pear against endwise displacement from a supporting impaling holder during a peeling operation by a rotatable retainer axially offset from the pear's stem-blossom axis, and rotated to minimize frictional engagement with the pear.

Another object is to provide improved fruit peeling facilities for a fruit preparation machine.

Another object is to provide an improved fruit peeling mechanism whereby a fruit is carried around a circular path with its stem-blossom axis substantially tangent to such path, the fruit being slowly rotated about its axis while passing a plurality of stationary spring biased peeling devices.

Another object is to provide means for peeling fruit by a succession of lengthwise spiral peeling cuts while the fruit is moving lengthwise along a predetermined path and simultaneously is being rotated about its axis.

These and other objects and advantages of the invention will become apparent from the following description read in conjunction with the accompanying drawings in which:

Fig. 1 is a perspective of the drive or peeling side of a fruit preparation machine embodying the invention.

Fig. 2 is a perspective of the fruit ejecting side of the machine, the view illustrating the side opposite to that shown in Fig. 1.

Fig. 3 is an enlarged plan of the machine.

Fig. 4 is a vertical section of the upper half of the machine taken along line 4—4 of Fig. 3.

Fig. 5 is a vertical section of the lower half of the machine taken along the same line 4—4 of Fig. 3.

Fig. 6 is an enlarged fragmentary section taken in the same plane as Fig. 4 and showing a portion of a stemming tube turret, a stemming tube bushing being shown in section.

Fig. 7 is an enlarged section taken along the line 7—7 of Fig. 4 and showing the stemming tube drive mechanism, certain portions being broken away.

Fig. 8 is an enlarged fragmentary section through a stemming tube drive gear taken along the line 8—8 of Fig. 7.

Fig. 9 is an enlarged fragmentary perspective of a stemming tube drive assembly with an outer end cover removed and a portion of the stemming tube hub and drive shaft housing broken away.

Fig. 10 is a perspective of the stemming tube outer end cover removed from the showing in Fig. 9.

Figs. 11 to 16 inclusive show somewhat diagrammatically, as on a curved vertical section taken just outside the stemming tube cam tracks, the mechanism for controlling the tilting of the stemming tubes and their rotation about their own axis.

Fig. 17 is an enlarged perspective of the inner or driven end of a stemming tube assembly as it would appear when removed from the machine, a portion of the stemming tube hub and the outer end portion of the stemming tube assembly being broken away.

Fig. 18 is a fragmentary horizontal section taken along line 18—18 of Fig. 6.

Fig. 19 is a planiform diagrammatic development of a cam track for tilting the stemming tubes and associated locking ring and rack for controlling operation of the stemming tubes.

Fig. 20 is a horizontal enlarged fragmentary section taken along the line 20—20 of Fig. 6.

Figs. 21 and 22 are enlarged fragmentary lower perspective and top plan views, respectively, of a marginal portion of one of the stemming tube tilting cam plates shown in Fig. 20, showing one of four spring pressed segments inserted in the cam track for maintaining the stemming tubes in absolute vertical position during fruit transferring operations.

Fig. 23 is a somewhat diagrammatic horizontal section of the machine taken along line 23—23 of Fig. 4, parts other than those pertaining to the operation of the peeling mechanisms being omitted.

Figure 24:
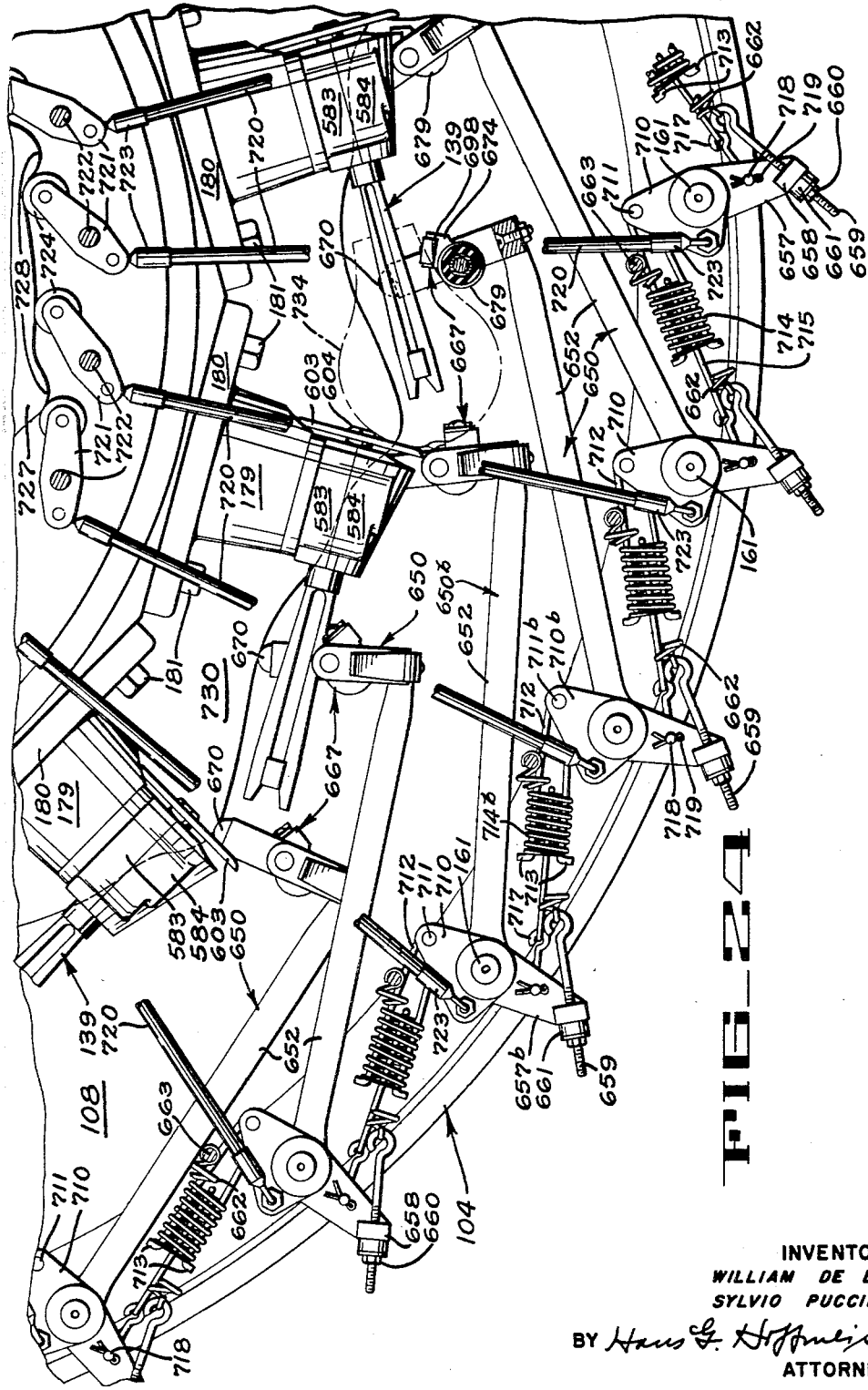

Fig. 24 is an enlarged fragmentary section taken along the line 23—23 of Fig. 4, a pear being shown in broken lines in position on one of the stemming tubes, and the middle portions of a plurality of cam actuated peeling arm control links and also of a plurality of peeling arm biasing springs being broken away.

Figure 25:
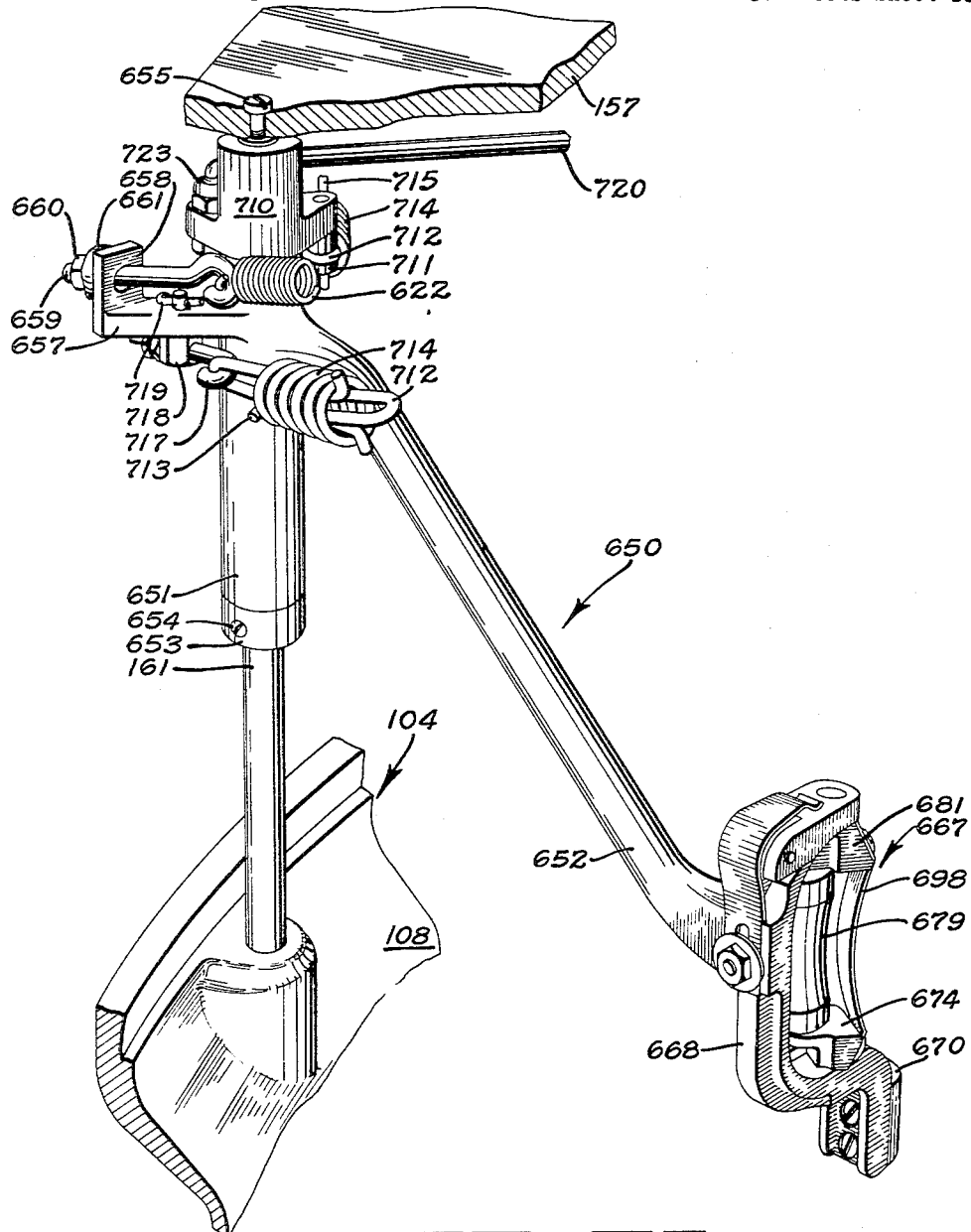

Fig. 25 is an enlarged fragmentary perspective of a peeling arm assembly and its supporting parts.

Before entering into a detailed description of the illustrated embodiment of the present invention the following brief description will assist in an understanding of the general arrangement and operation of the machine. Throughout the present description of the machine, the words "outwardly" and "inwardly" and words of like import will mean "radially outwardly or inwardly relatively to the central vertical axis of the machine," while "forwardly" and "rearwardly" and words of similar import will mean "forwardly or rearwardly with respect to the rotative direction of the continuously rotating stemming tube turret." The terms "clockwise" and "counterclockwise" indicate the direction of rotation as viewed from above the machine.

A fruit feeding station A (Figs. 1, 2 and 3), at which an operator stands and feeds fruit into the machine two at a time, is adapted to receive and support containers, or lug boxes as they are called, of the fruit to be prepared, in this instance pears, from an ordinary roller conveyor B. A number of lug boxes are kept constantly at hand on the conveyor, so that as soon as one is emptied another will be immediately available. It will be understood, of course, that automatic feeding mechanism may be substituted for the hand feeding arrangement illustrated. Such a mechanism is shown for example in the U.S. patent to Albert R. Thompson, No. 2,596,798.

The feeding station A has two feed cups to receive the pears, stem end down, from the operator. These feed cups are in fruit receiving condition practically all of the time, so that it is not necessary for the operator to maintain a closely timed synchronism of operation with the machine. This tends to speed up operation and greatly reduces operator tenseness and fatigue. The stem ends of the pears are trimmed off in the feed cups just prior to their release therefrom.

A continuously rotating stemming tube turret C (Figs. 1 and 4) is mounted directly beneath the feed cups. A fruit transfer mechanism D is mounted for combined rotatively oscillating and vertically reciprocating movement to describe a path along a curved upright surface between the feed mechanism and the stemming tube turret. The operation of the transfer mechanism D is so timed with relation to the intermittent operation of the feed mechanism A and the continuous rotation of the stemming tube turret C, as to position the transfer means D directly beneath the feed cups when they open to discharge their fruit. The transfer means receives the fruit thus dropped, and then, after aligning the fruit axially, moves the fruit slowly downwardly and swings it in axially aligned congruent relation to impaled condition on a stemming tube (Fig. 4). Thereafter, the transfer means releases the fruit, is raised clear of the fruit, and again is returned to fruit receiving position beneath the feed cups in time to receive the next fruit discharged therefrom.

After a pear has been impaled on a stemming tube, the tube is tilted rearwardly from the vertical position, which it occupies during the transfer to the stemming tube stage of the cycle, to an axially horizontal position. In this horizontal position the stemming tube, and the pear impaled thereon, are slowly rotated about their common axis. While thus rotating, the pear is carried past a peeling stage E, Fig. 1, where successive spiral strips of peel are cut lengthwise from the fruit.

After passing the peeling stage of the cycle the stemming tube and the pear thereon again are swung to axially upright position, and pass beneath a combined fruit halving or splitting, seed cell severing, and calyx trimming station F (Fig. 2). This latter station is mounted to oscillate back and forth in timed relation with the operation of the fruit transferring mechanism D and the continuously rotating stemming tube turret C.

A fruit gripping means G (Fig. 2) is mounted to oscillate with the transfer means C and the splitting, calyx trimming and seed cell severing station F. The gripping means reaches down and grips the pears on the stemming tubes, as they pass beneath the splitting station F, and draws the pears upwardly onto station F where the halving, seed cell severing and calyx trimming operations are performed.

Thereafter the fruit halves, now completely prepared, are released by the gripping means G and are ejected from the machine. This completes the fruit preparation cycle, and immediately thereafter the now upright stemming tubes from which the pears were removed by the gripping means again pass into alignment with the transfer means D whereupon the above cycle is repeated.

The present divisional application is particularly concerned with the fruit peeling mechanism at stage E. The fruit feeding and stem end gauging mechanisms at station A are completely disclosed in the previously mentioned parent application, S.N. 114,168, now Patent No. 2,699,191, issued January 11, 1955, as is also the stem end trimming mechanism, the fruit transfer and impaling mechanism, the fruit splitting, seed cell severing, and calyx trimming apparatus, and the control mechanism. The parent application should be referred to for a comprehensive description and complete illustrations of these mechanisms.

Frame structure and drive

The general arrangement of the machine and its principal operating assemblies and the manner of driving these principal assemblies by mechanical drive means will now be set forth. It will facilitate an understanding of the illustrative embodiment of the invention if it is borne in mind that the mechanisms pertaining to the orbital travel of the fruit around the machine are driven mechanically, while the mechanisms pertaining to fruit feeding, impaling, calyx trimming, seed celling, splitting and ejecting are principally operated by pneumatically actuated mechanisms controlled by cam actuated valves operated in timely relation with the mechanical driving mechanism. While having certain advantages, it is obvious, of course, that the pneumatic operation of the illustrated embodiment of the invention could be replaced by a designer of ordinary skill, with mechanical actuating means such as the usual links, levers, cams, gears and the like employed for such purposes.

It will be of assistance in visualizing the machine as a whole to join the lower broken line of Fig. 4 with the upper broken line of Fig. 5. This will provide a composite vertical sectional view of the entire machine along the line 4—4 of Figure 3.

The present machine has a three part supporting base and drive housing 100 (Figs. 1, 2 and 5) comprising a circular lower base portion 101 of inverted cup shape with supporting legs 102 thereon. A substantially cylindrical intermediate base portion 103 is mounted on the lower base portion 101, and an upper cup shaped base portion 104 is mounted on the upper edge of the intermediate portion 103. An oil sump and bottom closure plate 105 is secured to an inwardly projecting flange 107 in the lowermost base portion 101.

A circular horizontal waste trough 108 (Fig. 4) for catching the cores and peelings produced during the operation of the machine, surrounds the upper end of the uppermost base portion 104 and forms an integral part thereof. A lug box table 109 (Fig. 4) for supporting lug boxes 110, indicated in dotted lines in Fig. 1, is mounted on a supporting bracket 111, which is secured by cap screws 112 (Figs. 4 and 5) to a side of the intermediate base portion 103, and also to bosses 113 provided on a side of the annular waste trough 108. This bracket 111 also supports a fruit feed table 114 (Fig. 3) formed integrally with the feed table 109. A pair of feed cup assemblies 115 (Fig. 3) are mounted on the feed table.

The top closure plate 116 (Fig. 5) of the lowermost base portion 101, has a downwardly extending boss 117 formed centrally thereof. This boss has an internally threaded hole axially therethrough, into which a threaded bearing support bushing 118 is screwed. The bushing is secured in adjusted position by a set screw 119. The bushing 118 has the annular inner race of a roller bearing 121 fitted into an annular recess around its upper end as shown in Fig. 5. The roller bearing 121 is mounted rotatably to support the lower end of a barrel cam 122 which vertically reciprocates a fruit transfer head 120 (Fig. 4) of the transfer mechanism D.

The barrel cam 122 is a composite member, as best shown in Fig. 5, and comprises a lower cylindrical cam portion 123 formed integrally with a lower driven gear portion 124. The lower cylindrical cam portion has a cam face 125 formed on the upper edge thereof. A complementary upper cylindrical cam portion 127 has a lower cam face 128 thereon spaced from the cam face 125 on the lower cam portion 123 by a distance sufficient to permit a cam follower roller 129 to operate between these two cam faces. The upper and lower barrel cam portions 123 and 127 are secured rigidly together in axially aligned adjusted relation by a surrounding cylindrical sleeve 130 which is secured to the upper and lower cam portions by screws 131. The upper barrel cam portion 127 is journaled on a bushing 132 which is mounted on the lower projecting end of a stationary, tubular, central column 133 (Figs. 4 and 5).

The tubular central column 133 has a press fit in an upwardly projecting central boss 134 formed on the bottom plate of the uppermost base portion 104. The column is secured against rotation in this boss by a key 135 (Figs. 4 and 5).

A pair of stationary annular cam tracks 137 and 138 (Figs. 4 and 6) for controlling the tilting movements of fruit carriers or stemming tubes 139 as they travel in a circular horizontal orbit around the machine, are mounted on the upper and lower ends, respectively, of an annular hub 140. The hub 140 is mounted on the stationary tubular central column 133, as shown in Figures 4 and 6, and is secured thereto by a locating key 141 (Fig. 4), and a jamb nut 142 and sleeve 143 (Fig. 18) which are inserted in a hole 144 drilled transversely through the hub. The hole 144 opens substantially tangentially into the axial bore of the hub. The jamb nut and sleeve are drawn into tight frictional engagement with the stationary central column 133 by a bolt 145.

A ring 150 having a segmental toothed rack 151 (Fig. 18) cut in the upper side thereof, and a stemming tube gear locking ring 152 (Figs. 4 and 6) are bolted in superposed relation on the lower cam track 138 for purposes to be explained later herein. An abutment ring 153 (Figs. 4, 6 and 7) is pressed onto the slightly reduced upper end of the hub 140 to seat in the shoulder formed by the offset between the lower and upper portions of the hub. The abutment ring 153 is of hard smooth metal such as heavy chrome-plated steel, and is positioned so that the inner ends of stemming tube drive shafts 154 ride along it to receive the thrust of these shafts created upon their rotation by a worm gear to be described later herein.

A stationary mounting flange 155 (Figs. 4 and 6) is clamped tightly around the upper end of the stationary central column 133, and a stationary peeling arm pivot support plate 157 (Fig. 4) is secured to this flange by screws 158. A grease seal retaining washer 159 is secured in place on the plate supporting flange 155 by screws 160. The peeling arm pivot support plate 157 (Figs. 4 and 25) fixedly supports the upper ends of a plurality of upright peeling arm pivot pins 161 which are mounted between this stationary plate and the outer marginal edge of the annular waste trough 108. The peeling arms and their associated peeling mechanism will be described later herein.

From the foregoing it will be apparent that the central column 133, being securely fixed in the boss 134 of the uppermost base portion, will remain stationary during the operation of the machine; as likewise will the annular hub member 140, the thrust ring 153, the upper and lower stemming tube control cams 137 and 138 mounted on the hub 140, the stemming tube rotary drive rack ring 150, the stemming tube locking ring 152, and the peeling knife pivot support plate 157.

The machine is provided with a fruit holder carrier in the form of a stemming tube turret 170 (Figs. 4, 6 and 7) which comprises interconnected upper and lower turret portions 171 and 172. The lower turret portion 172 is journaled on a bearing bushing 173 on the central column 133, and is supported on a thrust washer 174 (Fig. 4) on top of the boss 134.

The lower turret portion 172 has an upstanding marginal wall 175 around it, on the outer side of which are machined twelve similar, equally spaced, flat, stemming tube mounting faces 177 (Figs. 4, 6 and 7). The wall 175, centrally of each of these faces, has openings 178 (Fig. 6) therethrough to receive twelve stemming tube mounting hubs 179. Each stemming tube hub has a marginal mounting flange 180 formed integrally therewith which overlies and seats on the face 177 around the hole in which the hub 179 is mounted. The flange 180 is secured to the turret wall by cap screws 181. The details of the stemming tubes will be described in detail later herein.

A rubber waste trough wiping blade 176 (Fig. 4) which conforms to the shape of the waste trough 108 is fastened to a radially projecting bracket 168 on the lower stemming tube turret portion 172 to sweep peelings and cores produced by the operation of the machine around the trough and out through a waste discharge opening 169 (Fig. 3).

The upper stemming tube turret portion 171 (Figs. 4 and 6) comprises a domed plate or cover portion 182 which is secured to the upper edge of the marginal wall 175 of the lower turret portion 172 by screws 183. The dome cover plate 182 has a hub portion 184 which is journaled on a bearing sleeve 185 on the stationary column 133. A ring gear 162 (Figs. 4 and 6) for driving a pneumatic control valve mechanism is mounted on the upper stemming tube turret member by screws 163.

The entire stemming tube turret assembly is rotated as a unit at a constant speed in a counterclockwise direction (Fig. 3) during operation of the machine by means of a gear mechanism which is indicated generally in Fig. 4 by the reference numeral 186. This gear mechanism is fully disclosed in the above-mentioned parent application.

*Stemming tube turret and stemming tubes*

The stemming tubes 139 (Figs. 4, 6, 7 and 9 to 22 inclusive) are twelve in number and, as previously set forth herein, are mounted, in equal angularly spaced relation, on individual hub members 179 secured by cap screws 181 in openings 178 centrally of twelve flat vertical faces 177 machined on the exterior of the marginal wall 175 of the lower stemming tube turret portion 172. The lower turret portion 172 and its associated top closure portion 171 are journaled on the central tubular column 133 of the machine, and the turret is rotated at a constant speed about the axis of this column by the gear mechanism 186.

Each stemming tube hub 179 (Figs. 6, 7, 8 and 9) has a stemming tube housing in the form of a supporting bushing 582 (Fig. 6) journaled therein. The outer end of the stemming tube supporting bushing 582 has a gear case 583 formed therein, with a removable complementary cap portion 584 (Figs. 9 and 10) adapted to be secured thereon by screws 585.

A worm gear 587 and corresponding spiral gear 588 are mounted in each gear case thus formed. The worm gear 587 is cut in the outer end of the stemming tube drive shaft 154 which is journaled in bearing sleeves 590 and 591 (Fig. 6) in the stemming tube support bushing 582. The worms and their intermeshing spiral gears of alternate stemming tubes about the stemming tube turret are of opposite hand, so that, since the stemming tube drive shafts are all rotated in the same direction, alternate stemming tubes will be rotated in opposite directions. The reason for this will be brought out later herein in connection with an explanation of the operation of the pear peeling mechanism.

The spiral gear 588 on the stemming tube has its axis at right angles to that of the stemming tube drive shaft 154, and has an axial bore therethrough in which a stemming tube 139 is adapted to be inserted (Fig. 8). The stemming tube spiral gear 588 has a hub portion 589 (Figs. 8, and 9) journaled in bushings 593 and 594 which are mounted in complementary semicircular recesses in the end of each gear casing 583 and its cap 584. Annular sealing members 597 and 598, of a usual type, also are gripped in the semicircular recesses in the gear case portion 583 of the stemming tube support bushing and in the cap 584 to seal against the admission of fruit juices into the gear chamber and the escape of lubricant therefrom.

The upper end of the bore through the hub of the stemming tube support gear 588 is threaded to receive an externally threaded lower end portion of a stemming tube support sleeve 599 therein. The sleeve 599 is provided with holes 617 in its upper end to accommodate a usual spanner wrench for screwing the bushing into the bore. A tapered, split, compression sleeve 600, fits into a correspondingly tapered portion 601 of the bore in the spiral gear 588 below the threaded sleeve 599 therein, and is forced downwardly by the threaded sleeve 599 as it is screwed into the hub of the gear 588 to wedge the split compression sleeve 600 into tight frictional gripping relation with the shank portion 602 of the stemming tube 139. The shank of the stemming tube is of a length to extend entirely through the hub of the gear 588, the lower end of the bore through the gear 588 being of a size to receive the shank of the stemming tube with a relatively close sliding fit therein.

Each stemming tube (Fig. 8) has a pear retaining disk 603 mounted on its shank end. Each pear retaining disk 603 has a hole centrally thereof, and is secured in axially aligned position on the shank or leading end of the stemming tube by a screw 604 which passes through the hole in the disk and is screwed into a threaded hole in the end of the stemming tube shank portion 602.

The opposite rotation of alternate stemming tubes as mentioned previously herein causes the contacting surfaces of the pear and its retaining disk on the shank end of the stemming tube next rearwardly thereof to travel in the same linear direction. This zone of contact between the disk and the pear may be either closer to or farther away from the axial center of rotation of the disk than it is from that of the pear. This difference may produce either a drag, or may tend to assist the rotative driving effect of the stemming tube upon which the pear is impaled. Therefore to prevent the torque thus produced from unscrewing the disks, each retaining disk 603 is in effect keyed to its supporting stemming tube by tongues 615 on the disk (Fig. 8) which are inserted in endwise notches 616 in the stemming tube shank.

The upper portion of each stemming tube, upon which the pears are impaled, has an oval tubular upper end portion 605 (Fig. 6) with the upper edge 607 thereof sharpened to a cutting edge for severing the stem and stem fibres from the flesh of the pear as it is impaled thereon. The stemming tube has a semi-tubular portion 608 to provide longitudinal strength and still to allow the severed stems to fall clear. The semi-tubular portion 608 has a sloping lower end 609 which acts as a cam to eject any stem portion which may tend to remain in the stemming tube after a pear preparation cycle is completed. Any such stem will be cammed out of the semi-tubular portion 608 when it is subjected to endwise pressure by the impaling of the next pear on the stemming tube.

A pair of wing blades 610 and 611 with sharpened upper edges extend laterally from the sides of the semi-tubular portion 608 of the stemming tube. These blades prevent the pears from turning on the stemming tubes. These blades, in accordance with usual practice, and to avoid cuts in the prepared product, are arranged to align with the plane along which the pears subsequently are split into halves.

Means for tilting the stemming tubes from an upright to a horizontal position and back again at predetermined points in their rotative orbit comprise a cam actuated tilting block 612 (Figs. 6, 7 and 17) secured to the inner end of each stemming tube support bushing 582, and bearing against the inner end of its stemming tube support hub 179. Each stemming tube tilting block 612 has an opening therethrough (Fig. 6) to receive the inner end of the stemming tube bushing 582, and is split along one side for clamping to the bushing. The tilting block is secured to the bushing 582 by a key 614 (Fig. 6) and a clamp screw 613 (Fig. 7).

Each stemming tube tilting block 612 has three studs 618, 619 and 620 (Fig. 17) mounted to project inwardly therefrom. The axes of these studs are parallel to each other and to the axis of the stemming tube drive shaft 154. The studs are arranged so that their axes (Fig. 15), together with the axis of the stemming tube drive shaft, define a square. Three cam follower rollers 621, 622 and 623 are mounted on the studs 618, 619 and 620, respectively. The rollers 621 and 622 being equally distant, axially, from the stemming tube drive shaft 154 along two sides of the square defined by them, are mounted laterally opposite each other. The third roller 623 however (Fig. 15) being spaced from the axis of the stemming tube drive shaft along the diagonal of the square defined by the axes of the three rollers, and the axis of the stemming tube drive shaft 154 is offset axially inwardly from the other two rollers 621 and 622 (Fig. 17) in order that it can follow different portions of the cam faces from those followed by the rollers 621 and 622 during tilting movements of the stemming tube tilting block 612 about the axis of the stemming tube drive shaft 154.

The upper and lower cam plates 137 and 138 (Figs. 4 and 6) for tilting the blocks 612 and their associated stemming tubes, are stationary, as mentioned previously herein, being affixed to the stationary hub 140 on the central tubular column 133. Cam faces 630 and 631 (Figs. 18, 19 and 20) of these two cam plates are each approximately twice as wide as the cam follower rollers 621, 622 and 623 on the tilting block 612, so that the inwardly offset diagonally located roller 623 can ride on the inner portions of these cam faces, while the other two rollers 621 and 622 can ride on the outer portions thereof.

As will be seen in the developed side elevational view of Fig. 19, the cam track 632, defined by the cam faces 630 and 631, has a high portion 633 and a low portion 634. This cam track, as will be noted in Figs. 11 to 16, is of a height to receive the rollers 621, 622 and 623 therebetween when the square defined by the axes of the rollers and the stemming tube drive shaft has two sides thereof horizontal and the other two sides upright as in Fig. 15.

The stemming tube drive shafts 154 follow a continuous circular horizontal path or orbit along the mean central plane of the cam track 632. Thus, when the rollers are in the low portion 634 of the cam track (Figs. 13, 14 and 15) they will swing the stemming tube support bushings to tilt the stemming tube axis to the horizontal position indicated by the arrows 635 in these figures; and when the rollers are in the high portion 633 of the cam track (Fig. 11) the bushings 582 will be swung to tilt the stemming tubes upright.

The tilting movement of the stemming tubes from upright to the horizontal (Fig. 12) and the reverse (Fig. 16) is accomplished by sloping the inner and outer portions of the cam tracks substantially as shown, the track slopes preferably being designed to maintain all three rollers in contact therewith during a major portion of the tilting movements. The curvature of each sloping portion of the cam track 632 is determined in accordance with usual design practice to accommodate the combined orbital and pivotally swinging movements of the different rollers according to their repective arcs of travel.

During the time the pears are being impaled on their stemming tubes, and also while they are being transferred from the stemming tubes to the splitting blades in a manner described in the parent application, the stemming tubes are in an upright position (Fig. 11) and the then uppermost rollers 621 and 623 are pressed forcibly downwardly by four, similar spring pressed segments 626, 627, 628 and 629 (Figs. 6, 20, 21 and 22) mounted in gaps provided therefor in the upper cam plate 137. Each spring pressed segment has a positioning pin 647 (Figs. 21 and 22) mounted to extend downwardly from the inner end thereof, and these pins are inserted with a loose wobble fit in locating holes provided in the cam track plate 137 inwardly of the gaps in the cam track provided to receive the segments. Each segment has a pair of cap screws 637 screwed into the under side thereof. These screws pass through holes in the upper cam plate 137 and are urged downwardly by coil springs 644 which surround the cap screws 637 and are held in compression between washers 636 beneath the heads of the cap screws and the bottoms of a pair of recesses 645 provided in the plate 137 around each of the holes for the cap screws 644.

The under, roller engaging faces of these spring pressed cam track segments (Figs. 6 and 20) are less than the full width of the upper cam face 630. The reason for making the faces of these segments narrower than the remainder of the cam track is to facilitate equalizing the pressure on both rollers 621 and 623 (Fig. 6).

The stemming tube drive shaft 154 is locked against rotation throughout its entire orbit except during the peeling phase thereof, during which time it is slowly rotated through one complete revolution. This peeling phase occurs when the stemming tube is in the horizontal position which, as mentioned previously herein, is during the time the tilting rollers 621, 622 and 623 are in the low portion 634 of the cam track 632 (Fig. 19).

Rotation of the stemming tube about its axis during the peeling phase of its orbit is accomplished by a bevel spur gear 638 (Figs. 6, 7 and 11 to 17) which is secured by a key 639 (Fig. 6) on the reduced inner end of the stemming tube drive shaft 154 for rotative engagement by the segmental, arcuate, toothed rack 151 (Figs. 4, 7, 13, 14 and 18) while the stemming tube is in the horizontal position. During the remainder of its orbit the stemming tube is locked against rotation by a locking cam follower 640 (Fig. 6) which is mounted on the inner end of the stemming tube drive shaft and is secured to the bevel gear 638 by a locking pin 641. Both the bevel gear 638 and the locking cam follower 640 are secured, by a nut 642 and lock washer 643, against the shoulder formed by the offset at the outer end of the reduced inner end portion of the stemming tube drive shaft.

The locking cam follower 640 rides on the cam face of the ring cam 152 (Figs. 6, 11, 12, 16, 18 and 19) except during the time the stemming tube drive gear 638 is in engagement with its rack 151. During the rack engaging portion of its orbit the cam ring 152 is cut away (Figs. 13, 14, 15, 18 and 19) to free the stemming tube drive shaft for rotation. The number of teeth in the stemming tube rotating spur gear 638 and its actuating rack 151 are proportioned relatively to the gear ratio of the stemming tube drive worm 587 and its associated helical gear 588, which rotate the stemming tube 139 about its axis. The stemming tube is to be rotated through one complete revolution about its axis during each complete rotative cycle of the machine. Therefore, if the spur gear 638 makes three rotations during its passage over the rack 151, the drive from the worm gear 587 to the stemming tube supporting helical gear 588 will be in the ratio of one to three.

*Peeling mechanism*

The peeling mechanism is shown best in Figs. 4, and 23 to 25 inclusive. In conjunction with these figures, Figure 7 shows the positions of the stemming tubes at different stages of their orbit of travel around the machine.

Each of twelve peeling arm assemblies 650 is pivoted on one of the vertical pivot pins or rods 161 (Figs. 1 and 25). The upper end of each pivot rod 161 is secured to the stationary peeling arm support plate 157 by a screw 655 which passes through a hole in the plate and is screwed into a threaded hole in the upper end of the pivotal mounting rod 161, while the lower end of the pivot rod is similarly connected to the outer edge of the annular waste trough 108.

Each peeling arm assembly 650 (Fig. 25) comprises a hub portion 651 with an inwardly and downwardly extending arm portion 652. A support collar 653 secured to the pivot rod 161 by a set screw 654 supports the hub 651 in adjusted position. A spring connected torque arm 657 is formed integrally with the hub portion 651 and extends diagonally outwardly from the hub. This diagonal spring connected torque arm 657 has an upwardly bent outer end portion 658, through a hole in which is inserted the threaded shank of a spring securing hook 659. A nut 660 is screwed onto the threaded shank of the hook to hold it in endwise adjusted position in the spring connected arm 657, and a rubber bumper 661 (Fig. 25) is interposed between the nut 660 and the arm.

A coil spring 662 has a hook formed on one end thereof hooked into the securing hook 659, the other or forward end of the spring being hooked onto a pin (Fig. 24) mounted on the under side of the peeling arm support plate 157 to hold the spring in tension, and thereby to urge the peeling arm to swing in a counterclockwise direction or inwardly about its pivot rod 161 as shown in Figs. 23 and 24.

A peeling knife head assembly 667 (Fig. 25) is mounted on the inner or free end of each arm portion 652, see also Fig. 24. The peeling knife heads which are fully described in the parent application, are generally similar to those described in Patent No. 2,139,704 to A. R. Thompson et al. issued December 13, 1938. The parts for a peeling knife head assembly and the mounting therefor are shown assembled in Fig. 25.

In general each peeling knife head assembly 667 (Fig. 25) comprises a curved blade 698 secured in spaced support members 674 and 681 which are mounted for free swinging movement over a limited angular range in a bracket 668 provided on the end of the arm portion 652. A semi-cylindrical cam follower block 670 is secured to and extends downwardly from the bracket 668. A concave guide roller spool 679 is rotatably mounted in the support members 674 and 681 near the blade 698. The curvature of the blade follows in general the curvature of the roller and both are designed so that the blade will take a peeling cut of the proper depth, width, and curvature from the pears. The pivotal mounting axis of the peeling head assembly 667 in the bracket 668 is eccentric to that of the roller 679 so that the roller has a caster effect which swings the blade to proper peeling position when the peeling arm assembly 650 is spring pressed into engagement with a pear. Complete structural details of the peeling head assembly are contained in the above mentioned parent application.

For producing an added inward torque on each peeling arm 652 at the moment its associated peeling head assembly passes the line of maximum girth of the pear and swings inwardly over the calyx end thereof, a triangular bell crank lever 710 (Figs. 24 and 25) is pivoted on the upper end of each of the peeling arm support rods 161 above the hub 651 and the peeling arm. The bell crank lever is free for independent pivotal movement relatively to the pivot pin 161 and to the peeling arm hub 651. A downwardly extending, peripherally grooved spring securing stud 711 is mounted on one arm of the bell crank lever 710, and a rearwardly extending U-shaped wire spring connector 712 (Figs. 24 and 25) has the bight of the U thereof hooked into the peripheral groove in the stud 711.

The ends of the U-shaped wire connector 712 are bent apart as at 713 to overlie and engage the rearward end of a compression spring 714 through which the bight of the U-shaped wire connector is inserted. A similar U-shaped wire connector 715 is inserted through the compression spring 714 in the opposite direction from the first connector 712, the laterally bent end portions of the second U-shaped connector overlying and engaging the forward end of the coil compression spring 714. The rearwardly extending bight of this second U-shaped wire connector is hooked into the forward end of a spring securing hook 717, the threaded shank of which is inserted through a hole in the head of an anchor pin 718. The shank of the anchor pin 718 is inserted upwardly through a hole in the spring biasing arm 657 on the hub of the peeling arm next rearwardly therefrom. The anchor pin 718 is retained in position in its hole by a cotter pin 719 (Fig. 25).

A substantially radially disposed, cam actuated, pull link 720 (Figs. 23, 24 and 25) connects the other arm of each triangular bell crank lever 710, from that having the grooved stud 711 thereon, to one end of a cam actuated lever 721 which is pivoted substantially centrally thereof on a stud 722 (Figs. 4, 23 and 24) on the under side of the peeling arm support plate 157. The cam actuated lever 721 has a cam follower roller 724 on the other end thereof from that which is connected to the pull link 720. The inner end of each pull link 720 is pivotally connected to its associated cam actuated lever 721, and its outer end to its associated triangular bell crank lever 710, by ball and socket connectors 723 (Fig. 25).

Since each bell crank lever 710 is spring-connected to the spring biasing lever arm 657 of the peeling arm assembly next rearwardly thereof (Fig. 23) the first peeling arm assembly 650a to be encountered by the fruit in its counterclockwise orbit has no bell crank lever mounted thereon, while an additional bell crank lever 710a with associated pull link 720a and cam follower lever 721a is mounted on an extra pivot rod 161a (as shown in Fig. 23) located in a counterclockwise direction beyond the last peeling arm pivot support rod 161.

A scalloped cam 727, for actuating the levers 721, is of generally circular shape with twelve scalloped cam projections 728 formed on its periphery. This cam is mounted on the upper side of the stemming tube turret cover 171 as shown in Figs. 4 and 6 to rotate therewith. One of the scalloped cam projections 728 is provided inwardly of each of the twelve stemming tubes 139, and these cam projections are so located relatively to the stemming tubes, that as each peeling knife passes over the bulb of the pear impaled on a stemming tube, and starts to move inwardly over the trailing calyx end of the pear, one of the cam projections 728 of the scalloped cam 727 will engage the cam follower roller 724 on the lever 721 associated with the triangular bell crank lever 710 mounted on the peeling arm pivot support post next in advance thereof, and thereby will cause the triangular lever 710 to swing clockwise about its pivot, as shown at 710b (Fig. 24). This swings the grooved spring anchoring stud 711b on the other arm of the triangular bell crank lever 710b forwardly, compresses the rearward spring 714b and increases the tension on the spring biased arm 657b, to which the spring 714b is connected.

This additional tension on the arm 657b increases the torque on the hub of the peeling assembly 650b and urges the peeling head 667 inwardly over the rearward or calyx end of the pear. Were it not for the application of this increased torque to the peeling arm as the peeling head passes beyond the bulge of the pear, the forward movement of the pear in its rotative orbit would tend to draw it away from the peeling knife as the knife passed the zone of maximum diameter of each pear. The result would be an inferior peeling action over the bulb or calyx end of the pear. The additional spring pressure applied to the peeling head by the present arrangement however produces a uniform peeling cut throughout the entire length of the pear. Proper peeling of the calyx ends of pears has presented a difficult problem in other types of pear preparation machines, so that the use of this and other portions of the present invention obviously are adaptable to many other types of fruit preparation machines.

A second scalloped cam 730 (Figs. 23 and 24) is provided for guiding the peeling arms and their supporting peeling heads. This second scalloped cam limits the inward swinging movement of the peeling arms to position the peeling heads properly for the initiation of each peeling cut, and to hold the peeling heads outwardly clear of any empty stemming tubes 139 on the stemming tube turret. It also prevents the peeling heads from swinging in so far at the terminal end of a peeling stroke as to damage the sharpened edge of the peeling blade on the pear retaining disk 603 on the forward end of the following stemming tube.

The second scalloped cam 730 (Figs. 4, 6, 23 and 24) is mounted on the lower stemming tube turret 172 to project outwardly therefrom (Fig. 6). This cam, 730 (Figs. 23 and 24) is made in two similar, complementary generally semi-circular sections 731 and 732 which are secured to the lower stemming tube turret portion 172 by screws 733, to rotate therewith. The semi-cylindrical cam follower blocks 670 on the lower end portions of the peeling head mounting brackets 668 are adapted to ride (Figs. 23 and 24) on the scalloped periphery of the cam 730.

During a peeling stroke on a pear 734 (Fig. 24) the engagement of the peeling blade and its guide roller with the body of the pear holds the peeling head outwardly, so that the cam follower block 670 is maintained clear of the cam 730. It is only in the event that a stemming tube should have no pear impaled thereon that the cam projections on the scalloped cam 730 will force the peeling head 667 outwardly sufficiently to move the blade 697 clear of the stemming tube 139.

Each pear retaining disk 603 is adjusted, by axial adjustment of the stemming tube into which it is screwed as set forth previously herein (Fig. 8), so as to permit the pear on the next stemming tube in advance thereof to be swung to its horizontal position without interference from the disk. Also, this adjustment of the retaining disk 603 is such that each disk will engage the calyx end of the pear on the next stemming tube in advance thereof during the peeling operation to prevent withdrawal of the pear from its impaled position on its supporting stemming tube. The position of the calyx end of the pear on the stemming tube is determined by the adjusted position of the presser disk 750 (Fig. 4) of the transfer mechanism D, which pushes the pear down to its final position on the stemming tube during a pear impaling operation when transferring the pear from the feed cup onto the stemming tube.

The calyx end of each pear when supported on its stemming tube 139 (Fig. 24) extends tangentially of its circular orbit a greater distance from its axis of tilting support about its radially disposed stemming tube drive shaft 154, than does the retaining disk 603. Therefore (Fig. 24) when a pear 734 is mounted on a horizontally disposed stemming tube 139, the retaining disk 603, on a similarly horizontal stemming tube next rearwardly thereof, will be disposed closer to the central vertical axis of the machine than the calyx end of the pear which it engages. Thus the retaining disk will engage a side portion of the calyx end of the pear, and will not rest immediately over the calyx. The axial offset thus attained between the axis of the pear and that of its associated retaining disk, is sufficient to permit the peeling blade 698 to take a full peeling cut inwardly across the calyx or trailing end of the pear to the point where the body of the pear curves inwardly into the calyx depression without danger of having the blade strike the associated retaining disk. With the axial offsetting of the disks provided by the above described arrangement, there is no need, as has been the case in previous pear peelers, to provide any special withdrawing mechanism for the retainer disk in order to get it out of the way of the peeling blade to permit completion of the peeling cut over the calyx end of the pear.

The peeling knives are spaced apart about the periphery of the machine so that each knife will initiate a new peeling cut after the pear has been rotated approximately $\frac{1}{12}$ of a revolution from the initiation of the preceding cut. The peeling blades are so curved and associated with their concave guide spools or rollers 679 that they will take a cut slightly greater in width than $\frac{1}{12}$ of the diameter of the pear. Thus there will be a slight overlap between successive peeling cuts to insure that no strips of unpeeled skin will be left between adjacent cuts. When a pear passes the twelfth or last peeling head in its orbit around the machine, the peeling will have been completed.

From the foregoing description it will be seen that the present invention provides an improved machine for peeling pears by moving the pear past a series of peeling knives while the pear is being continuously rotated about a horizontal axis. The novel butt plate which retains each pear on the stemming tube during the peeling operation and the novel spring mechanism for providing an extra inward movement of the knife as it passes over the butt of the pear cooperate with the other apparatus to provide an efficient and simple pear peeling machine.

Having thus described our invention what we claim as new and desire to protect by Letters Patent is:

1. A fruit preparation machine comprising a stationary support structure, a carrier mounted on said structure for movement along a fixed path relative to said structure, means for moving said carrier, a stemming tube mounted on said carrier in a substantially horizontal position and adapted to hold a fruit impaled thereon with the axis of the fruit generally aligned with the direction of movement of the stemming tube, a cutter pivotally mounted on said support structure adjacent the path of movement of said carrier, a first resilient means connected between said cutter and said support structure urging said cutter into the path of movement of a fruit on said stemming tube to engage the fruit and make a longitudinal peeling cut therein, a lever pivotally mounted on said support structure, a second resilient means operatively connected between said pivotal cutter and said lever and arranged when activated to bias said cutter in a direction to move toward the axis of said stemming tube upon pivotal movement of said lever, and a cam disposed on said carrier in fixed position relative to said stemming tube and operatively associated with said lever to pivot said lever and activate said second resilient means at a predetermined point during the traversing movement of the cutter over the fruit on said stemming tube.

2. A fruit preparation machine comprising a support member, a fruit holder carrier mounted on said support member for movement in a circular path, a stationary hub mounted on said support member adjacent said carrier, a fruit holder housing tiltably mounted in said carrier for rotation about an axis extending radially of said carrier, a fruit holder rotatably mounted in said housing for rotation about an axis normal to the axis of rotation of said fruit holder housing, means on said hub operatively connected to said fruit holder housing to tilt the housing during the movement of said carrier, and means on said hub operatively connected to said fruit holder to rotate said holder during movement of said carrier.

3. In a fruit preparation machine, a stationary hub, a fruit holder carrier mounted for movement in a circular path around said hub, a fruit holder housing tiltably mounted in said carrier for movement about an axis extending radially of said carrier, a fruit holder rotatably mounted in said housing for rotation about an axis normal to the axis of rotation of said fruit holder housing, gear means interconnecting said hub and said fruit holder to rotate said holder during movement of said carrier, and cam means interconnecting said hub and said housing to tilt said housing and the fruit holder therein movement of said carrier.

4. A fruit preparation machine comprising a base, a rotary stemming tube turret mounted on said base to rotate about a vertical axis, a plurality of stemming tube supports pivotally mounted on said turret to project radially from a portion of said turret and to be carried around a rotative orbit upon rotation of said turret, each stemming tube support being adapted to pivot about an axis disposed substantially radially of the turret with respect to the vertical axis of turret rotation, a fruit impaling stemming tube mounted on each stemming tube support with the longitudinal axis of the stemming tube normal to the pivotal axis of the support, said stemming tube being mounted for rotation about said longitudinal axis, and stationary cam means mounted at predetermined stages of the rotative cycle of the stemming tube turret and adapted to engage a portion of the stemming tube support to tilt the support and thereby swing the stemming tube successively between a position wherein said longitudinal axis of the stemming tube is vertical and a position wherein said longitudinal axis is horizontal.

5. In a fruit preparation machine, an impaling fruit holder adapted to impale a pear along its stem-blossom axis, means for moving said fruit holder along a predetermined path with the axis of the pear disposed lengthwise of said path and stem end first, a plurality of stationary peeling arm pivot posts mounted at predetermined spaced intervals along said path, a peeling arm pivoted on each pivotal post, a peeling head mounted on the free end of each peeling arm and adapted to have lengthwise peeling engagement with a pear on said fruit holder, primary spring means mounted to bias the pivotable peeling head toward the path of said fruit holder, primary cam means mounted for movement with said fruit holder and engageable with said peeling head to position said head to properly engage the stem end of each pear to initiate a peeling cut, normally unactuated secondary spring means connected at one end to said peeling head, and secondary cam means adapted to move in coordinated relation with said fruit holder and operatively connected to the other end of said secondary spring means to actuate the secondary spring means to increase the bias of said peeling head toward the path of said holder as said peeling head reaches a predetermined point as it traverses the length of the fruit holder.

6. A fruit preparation machine comprising a support structure, a fruit holder mounted on said support structure for rotation about its longitudinal axis and for linear movement relative to said structure at a fixed speed, said fruit holder being adapted to carry a fruit for rotary and linear movement therewith with the stem axis of the fruit disposed lengthwise of the path of movement of the holder, a plurality of peeling knives mounted in spaced relation along a length of said support structure to pivot on stationary axes along said path, said axes being normal to said path, spring means connected between said peeling knives and said support structure to bias said knives toward said path and into contact with the fruit to take a lengthwise peeling cut from the fruit as it moves past each knife, a rack mounted on said support structure substantially coextensive with said knives, and a pinion gear secured to each rotary fruit holder and in mesh with said rack, said rack and said pinion being arranged to continuously rotate said fruit through one complete revolution as the pinion traverses the length of said rack.

7. In a fruit preparation machine, a plurality of impaling fruit holders each adapted to hold a pear and to advance said pear along a predetermined path with its stem-blossom axis disposed lengthwise of said path, a plurality of peeling knives mounted at spaced intervals along said path and having a cutting edge extending into the path to take a lengthwise peeling cut from each pear as it moves past each peeling knife, means for rotating adjacent fruit holders and pears thereon in opposite rotary directions, and a fruit retaining disk mounted co-axially with each fruit holder to rotate therewith during its advancement past said peeling knives, each disk being disposed to have retaining engagement with the trailing end of a pear on the preceding fruit holder on a side of the pear axis opposite to that engaged by the peeling knife, the zone of engagement between the pear and the disk lying on opposite sides of their respective axes for travel generally in the same linear direction at the zone of engagement therebetween.

8. In a fruit preparation machine, a rotary turret, an axially rotatable impaling fruit holder on said turret adapted to impale a pear along its stem-blossom axis, means for moving said turret to carry said fruit holder along a predetermined path with the axis of the pear disposed lengthwise of said path and stem end first, means mounted on said turret and operatively connected with said fruit holder for axially rotating said fruit holder and the pear impaled thereon, a plurality of peeling arm pivot supports mounted on said turret at predetermined spaced intervals along said path, a peeling arm pivoted on each pivotal support, a peeling head mounted on the free end of each peeling arm and adapted to have lengthwise peeling engagement with a pear on said fruit holder, primary spring means mounted adjacent the path of said fruit holder and connected to said peeling head to bias the peeling head toward the path of said fruit holder, a rotating retaining disk mounted on said turret immediately behind said fruit holder in axially offset relation to the rotative axis of said fruit holder and adapted to engage the trailing end of a pear on a side of the pear axis opposite to the side engaged by said peeling head to retain the pear against endwise withdrawal from the fruit holder, normally unactuated secondary spring means connected to said peeling head to increase the bias of said peeling head toward the path of said fruit holder upon actuation of said second spring means, and cam means mounted on said turret in fixed spaced relation relative to said fruit holder and operatively connected to said secondary spring means to actuate the secondary spring means to increase said bias as said peeling head traverses the surface of the pear on said holder.

9. A fruit preparation machine comprising a turret, a rotary impaling fruit holder mounted on said turret and adapted to impale a fruit along its stem-blossom axis and to move said fruit along a predetermined horizontal path with its stem-blossom axis horizontal, a plurality of peeling knives mounted in equi-spaced relation adjacent said path and spring biased toward said path, means for rotating said holder and the fruit thereon about its horizontal axis at a rate proportional to the linear speed of movement of the fruit and the spacing between adjacent peeling knives, and fruit retaining means mounted on said turret and disposed adjacent each fruit holder to engage a portion of the fruit on the holder axially offset from the axis of said fruit on the side opposite from the side engaged by said peeling knives during travel of the fruit past said peeling knives to retain the fruit against substantial lengthwise movement of the fruit relative to the holder due to the action of said peeling knives.

10. A fruit preparation machine comprising a base, a turret rotatably mounted on said base, a fruit holder mounted on said turret for movement in a circular path, said fruit holder being adapted to hold a pear impaled thereon with the stem-blossom axis of the pear in a substantially horizontal position, a pair of spaced upright stationary posts on said base adjacent to and radially outwardly of said circular path, a cutter arm pivotally mounted on one of said upright posts, a cutting head on said arm adapted to engage a pear on said fruit holder and slice a segment of peel therefrom, a first spring connected between said base and said arm to pivot said arm inwardly toward said circular path, a lever pivotally mounted on the other of said upright posts, a second spring connected between said lever and said pivotal cutter arm to additionally bias said arm inwardly upon pivoting movement of said lever in a predetermined rotary direction, a cam follower on said lever, and a cam carried by said turret and having a camming projection at a fixed position on said turret relative to said fruit holder and arranged to engage said cam follower and pivot said lever in said predetermined direction as said cutting head traverses the pear on said fruit holder.

11. In a fruit preparation machine, a movable support member, first and second fruit holders pivotally mounted on said support member for movement from an upright position to a horizontal position, each of said fruit holders in upright position having a disk portion below the pivot axis and a fruit impaling portion above the pivot axis, means for pivoting said first fruit holder to a horizontal position, means for pivoting said second fruit holder to horizontal position to move the disc portion thereof to fruit retaining position adjacent the impaling portion of said first fruit holder, and a cutting knife movable relative to said first fruit holder in peeling engagement therewith to remove a longitudinal slice of peel therefrom.

12. A fruit preparation machine comprising a rotary turret, a plurality of pear holders pivotally mounted in spaced relation on said turret at a fixed distance from the turret axis, each of said pivotal holders being adapted to hold a pear with the stem-blossom axis of the pear in fixed oriented position relative to the holder, guide means engageable with each holder for retaining said holder in a position wherein the stem-blossom axis of the pear thereon is in general alignment with the direction of movement of said holder, gear means mounted adjacent the circular path of movement of said pivotal holders, a pinion carried by each of said holders and engageable with said gear means at a predetermined stage in the circular movement of said holder to rotate said holder and a pear impaled thereon through one complete revolution, a peeling cutter mounted for pivoting about a stationary axis adjacent said circular path and having a peeling head arranged to extend into the path of movement to contact the surface of the pear, a spring connected to said cutter and arranged to urge said peeling head toward the path of movement of said pear holder and into contact with a pear on said holder, cam means mounted on said turret, a lever mounted for pivoting movement about a stationary axis adjacent said peeling cutter, an auxiliary spring connected between said cutter and said lever to press said peeling edge against the pear upon pivoting of said lever in one direction, a cam follower connected to said lever and disposed in contact with said cam means, said cam means being disposed on said turret at a fixed position relative to the position of said pear holder to actuate said cam follower and pivot said lever to impart an additional inward pressure on the cutting head when said head has traversed a predetermined portion of the pear on the holder.

13. A fruit preparation machine comprising a support member, a fruit holder carrier mounted on said support member for movement in a circular path, a stationary hub mounted on said support member adjacent said carrier, a fruit holder housing tiltably mounted in said carrier for rotation about an axis extending radially of said carrier, a fruit holder rotatably mounted in said housing for rotation about an axis normal to the axis of rotation of said fruit holder housing, means on said hub operatively connected to said fruit holder housing to tilt the housing during the movement of said carrier, a segmental rack mounted concentric with the movement of said fruit holder carrier, a pinion gear operatively connected to said fruit holder and adapted to mesh with said segmental rack to rotate said holder during a portion of the movement of said carrier, and cam means for locking said fruit holder against rotation during the remaining portion of the movement of said carrier.

14. A machine for peeling pears or the like comprising a carriage movable along a fixed path, means for supporting a pear on said carriage, a support adjacent said path, a bellcrank pivotally mounted on said support and having an arm disposed adjacent said path, a cutter mounted on said bellcrank arm for movement in a plane passing through the axis of the pear, a spring connected between said support and said bellcrank to pivot said bellcrank in a predetermined direction to move said cutter toward and into contact with the pear moving along said path and to hold said cutter against the pear as said cutter traverses the pear from stem to blossom end, a linkage connected to said bellcrank and arranged when actuated to further pivot said bellcrank in said predetermined direction, and means carried by said carriage and operatively connected to said linkage for actuating said linkage at a predetermined point during the traversing of the pear by said cutter.

15. A machine for peeling pears or the like comprising a carriage movable along a circular path, means for mounting a pear on said carriage with the stem-blossom axis of the pear disposed tangential with said path, a support adjacent said path, a bellcrank pivotally mounted on said support, a cutter mounted on one arm of said bellcrank and projecting into the path of movement of the pear on said carriage, a spring connected between said support and said bellcrank and arranged to pivot said bellcrank in a predetermined direction to press said cutter against the pear as the pear is moved past the cutter, a lever pivotally mounted on said support, means interconnecting said lever and said bellcrank, a rod connected to said lever, and a cam carried by said carriage and arranged to actuate said rod to pivot said bellcrank through a fixed angular range at a predetermined interval during the movement of the cutter over the pear from stem to blossom end.

16. A machine for peeling pears or the like comprising a carriage mounted for movement along a predetermined path, means for mounting a pear on said carriage, a support adjacent said path, a bellcrank pivotally mounted on said support, a cutter carried at the outer end of one arm of said bellcrank for movement in a plane through the axis of the pear, a spring connected between the other arm of said bellcrank and said support and arranged to pivot said bellcrank in a fixed direction to move said cutter into the path of a pear on said carriage, a lever pivotally mounted on said support, a resilient linkage connected between said lever and said other arm of said bellcrank, said linkage being arranged to pivot said bellcrank in said fixed direction when said lever is actuated, and abutment means carried by said carriage in operative association with said lever and arranged to actuate said lever at a predetermined point in the traverse of said cutter along the pear.

17. In a fruit preparation machine, a support structure, a first impaling fruit holder having a free end portion adapted to support a pear impaled thereon with the stem axis of the pear disposed in a substantially horizontal position, said fruit holder being movable relative to said support, a peeling knife mounted on said support to move in a generally horizontal direction toward and away from the path of movement of said pear, said peeling knife being adapted to slice a longitudinal strip of peel from the pear as said holder moves past said knife, a second fruit holder, and a fruit retaining disc mounted at the base of said second fruit holder and movable to a position closely adjacent the free end portion of said first holder to engage a portion of said fruit axially offset on the opposite side of the axis of said fruit from the side engaged by said knife to restrict axial movement of the pear relative to said first fruit holder during the peeling operation.

18. A fruit preparation machine comprising a rotatable turret, means for rotating said turret, a plurality of stemming tubes mounted on the periphery of said turret, each of said stemming tubes being mounted for rotation about its own axis, each stemming tube being disposed in a position with its longitudinal axis substantially tangent to the path of movement of said tube, each of said stemming tubes being adapted to hold a fruit impaled thereon with the axis of the fruit disposed substantially on the axis of the stemming tube, a stationary member mounted adjacent said turret, means interconnecting said stationary member and each stemming tube and arranged to rotate each tube about its own axis at a uniform rotary speed through one revolution as said tube traverses a predetermined portion of its path of movement, and a plurality of consecutive spaced peeling knives each mounted adjacent said turret for independent movement toward and away from said path of movement along said portion of the path of movement to contact the fruit and follow the contour thereof to remove longitudinal strips of peel, said knives being spaced along said path portion at predetermined positions related to the speed of rotation of the stemming tubes whereby the peeling cut made by each knife overlaps the cut made by the preceding knife.

References Cited in the file of this patent

UNITED STATES PATENTS

| Number | Name | Date |
|---|---|---|
| 688,909 | Warner | Dec. 17, 1901 |
| 1,773,267 | Happe | Aug. 19, 1930 |
| 1,905,578 | Tucker | Apr. 25, 1933 |
| 1,973,996 | Reinstein | Sept. 18, 1934 |
| 2,078,641 | Spencer | Apr. 27, 1937 |
| 2,139,704 | Thompson et al. | Dec. 13, 1938 |
| 2,410,683 | Marquez | Nov. 5, 1946 |
| 2,418,805 | Lindner | Apr. 8, 1947 |
| 2,431,310 | Coons | Nov. 25, 1947 |
| 2,461,249 | Anderson | Feb. 8, 1949 |
| 2,468,255 | Dunn | Apr. 26, 1949 |
| 2,489,581 | Mason | Nov. 29, 1949 |

FOREIGN PATENTS

| Number | Country | Date |
|---|---|---|
| 701,862 | France | Jan. 13, 1931 |